US006705516B1

(12) United States Patent
Kubota

(10) Patent No.: US 6,705,516 B1
(45) Date of Patent: Mar. 16, 2004

(54) PRODUCT MANAGEMENT APPARATUS AND PRODUCT WITH HISTORICAL INFORMATION RECORDING DEVICE

(76) Inventor: Michitaka Kubota, c/o Sony Corporation 7-35 Kitashinagawa 6-chome Shinagawa-ku, Tokyo (JP)

( * ) Notice: Subject to any disclaimer, the term of this patent is extended or adjusted under 35 U.S.C. 154(b) by 0 days.

(21) Appl. No.: 09/299,835

(22) Filed: Apr. 26, 1999

(65) Prior Publication Data

(65)

(30) Foreign Application Priority Data

Apr. 30, 1998 (JP) ........................................ P10-120855
May 11, 1998 (JP) ........................................ P10-127968
Aug. 20, 1998 (JP) ........................................ P10-234447
Aug. 24, 1998 (JP) ........................................ P10-237236

(51) Int. Cl.[7] ................................................ G06F 17/00
(52) U.S. Cl. ........................ 235/375; 235/487; 119/174
(58) Field of Search .......................... 119/174; 235/487, 235/385

(56) References Cited

U.S. PATENT DOCUMENTS 5,537,107 A * 7/1996 Funado .................. 340/825.72

* cited by examiner

*Primary Examiner*—Karl D. French
*Assistant Examiner*—Daniel A. Hess
(74) *Attorney, Agent, or Firm*—Robert J. Depke; Holland & Knight LLC

(57) ABSTRACT

A historical information recording device provided in a product for storing in a recorder product historical information relating to the product's manufacture, physical distribution, sale, registration, repair, and disposal and transmitting the information in response to information input from the outside, having a plurality of transmission modes and provided with a mode switcher for selecting a first transmission mode at the time of usual use and switching the transmission mode in response to an input signal to a second transmission mode with at least an output, frequency, method of modulation, or transmission time different from that of the first transmission mode, a historical information tamper prevention unit for prohibiting a write operation in the storage unit under predetermined conditions to prevent tampering of the product historical information, and a discriminator for discriminating if the recorder is the specific historical information recorder which should be covered by the recording and/or reproduction.

38 Claims, 20 Drawing Sheets

PRODUCT MANAGEMENT APPARATUS AND PRODUCT WITH HISTORICAL INFORMATION RECORDING DEVICE

BACKGROUND OF THE INVENTION

1. Field of the Invention

The present invention relates to a product management apparatus, a historical information recording device and a product provided with such a device, more particularly relates to a historical information recording device capable of electrically performing historical management, for example, from the manufacture of the product to its disposal, a product provided with the same, a historical information recording device having a function of switching to a transmission mode suitable for a case of broadcasting the location of a product or a function of preventing tampering etc. of the historical information, and product provided with the same, still more particularly relates to a historical information recording and/or reproduction device, a product having this, and a method for discriminating historical information recorder.

2. Description of the Related Art

In the related art, written guarantees are usually attached to audio visual equipment (AV equipment) and other products.

These written guarantees are generally made of paper and contain information relating to the product such as a model number of the product and the product serial no. and information relating to the sale such as the name of the store and the date of sale.

The general practice is to offer the service of free repair of the product based on the information in the written guarantee when the product breaks down in a predetermined guarantee period of for example one year from the date of sale of the product.

However, it is necessary for the user to store the written guarantee separately from the product. For this reason, if he or she loses the written guarantee, he or she sometimes is not eligible for the free repair when the product breaks down.

Further, since the written guarantee is made of paper or the like, depending on how it is stored, for example the surface of the guarantee may become moldy due to moisture or may become dirty so that the information sometimes no longer can be discriminated.

On the other hand, the information relating to the product of the written guarantee is indicated in advance on the manufacturer's side by printing or the like before shipment, but the information relating to the sale is described by the store stamping the store name and writing in the date of sale. When the product is for example a gift or a prize in a contest or when the store deliberately does not write in the date of sale, the starting date of the guarantee period cannot be identified.

For this reason, the manufacturer or a business which undertakes repair sometimes must perform the repair upon request by the user irrespective of the fact that the guarantee period has actually passed, so they sometimes suffer a loss by performing the repair free even though the repair originally should have been charged. Further, if the date of sale cannot be identified, it becomes impossible to correctly determine the service life and frequency of breakdown of the related product and parts thereof and otherwise statistically manage products after sale.

Further, it becomes possible to additionally record information other than the product information of the written guarantee and the sale information, for example, the date of arrival at a wholesaler in the distribution process, the date of shipment out from it, the name of the wholesaler, and other historical information of the distribution process, the date of repair when a product breaks down, the details of the repair, the person in charge of the repair, and other historical information of repair, and other historical information relating to the individual product. Such historical information has never before been recorded for individual products.

SUMMARY OF THE INVENTION

An object of the present invention is to provide a historical information recording device capable of reliably managing the historical information relating to a product and a product provided with such a device.

Another object of the present invention is to provide a historical information recording device capable of handling not only recording of data relating to the manufacture, sale, and repair of a product, but also a broader range of applications and a product provided with such a device.

Still another object of the present invention is to provide a historical information recording device capable of enhancing the reliability of stored information, for example, able to prevent tampering of once stored historical information, and a product provided with such a device.

Still another object of the present invention is to provide a historical information recording and/or reproduction device capable of reliably recording and/or reproducing historical information relating to a product, a product provided with such a device, and a method for discriminating a historical information recorder reliably managing historical information relating to the product.

To achieve the above objects, according to a first aspect of the present invention, there is a product management apparatus comprising: a main unit attached to a product and having an input unit inputting historical information of the product, a recording means for recording the input historical information, and a transmitting means for transmitting the recorded historical information; and an outside unit having a receiving means for receiving the historical information transmitted by the transmitting means.

According to a second aspect of the present invention, there is provided a product provided with a historical information recording device comprising: a main unit comprising an input unit for inputting the historical information, a recording means for recording the input historical information, and a transmitting means for transmitting the recorded historical information; said main unit communicates the historical information with an outside remote controller.

According to the above configuration, since the main unit has the input unit for inputting the historical information and the recording means for recording this input historical information, it can clearly record individual historical information of products. Further, since this recorded historical information is transmitted to the outside unit via the transmitting means of the main unit, the historical information can be correctly confirmed by using this outside unit.

Further, in a product provided with such a historical information recording device, since the historical information is provided in the product, the historical information can be managed for individual products.

According to a third aspect of the present invention, there is provided a product management apparatus comprising: a main unit having an input means for inputting historical information, a password imparting means for giving a password for at least part of the input historical information, a recording means for recording the historical information, and a transmitting means for transmitting the recorded historical information; and an outside unit having a receiving means for receiving the historical information transmitted from the transmitting means, a password comparing means for comparing the password given to the transmitted historical information, and a password inputting means for inputting a password to the password comparing means.

According to a fourth aspect of the present invention, there is provided a product provided with a historical information recording device comprising: a main unit comprising an input means for inputting historical information, a password imparting means for giving a password for at least part of the input historical information, a recording means for recording the historical information, and a transmitting means for transmitting the recorded historical information; and said main unit communicates with an outside remote controller said outside unit comprising: a receiving means for receiving the historical information transmitted from the transmitting means, a password comparing means for comparing the password given to the transmitted historical information, and a password inputting means for inputting a password to the password comparing means.

According to the above configuration, since the historical information recording device has the password imparting means, password comparing means, and password inputting means, it can record at least part of the historical information as protected information. Further, since this protected information is disclosed for the first time by the input of a specific password at the outside unit, the content of the protected information cannot be learned by a third party who does not know the specific password.

According to a fifth aspect of the present invention, there is provided a product management apparatus comprising a historical information recording device in a product for storing product historical information relating to the manufacture, physical distribution, sale, registration, repair, and disposal of the product and transmitting the information in response to a signal input from the outside, having a plurality of modes of transmission of the product historical information and comprising a mode switcher for switching the transmission mode based on the input signal.

Preferably, the mode switcher selects a first transmission mode at the time of usual use and switches the transmission mode from the first transmission mode to a second transmission mode based on the input signal.

Preferably, when using a radio wave as the carrier medium for the product historical information, the second transmission mode includes a transmission mode where the output, frequency, method of signal modulation, or transmission time of a carrier wave differs from that of the first transmission mode.

More preferably, the second transmission mode includes a transmission mode of the product historical information and a signal indicating information broadcasting the location of the product.

In this historical information recording device, it is possible to transmit a predetermined broadcast signal in response to an input broadcast request signal without relation to the transmission of the product historical information.

In the historical information recording device according to this configuration, if for example the input signal from the predetermined terminal is made to include specific signals such as a mode switching signal and broadcast request signal, the mode switcher switches the transmission mode of the historical information recording device from the first transmission mode at the time of normal use to the second transmission mode based on the specific signals. Accordingly, the subsequently transmitted signals are, for example, different in the output or frequency of the carrier wave or the method of signal modulation, transmission time, etc. from those at the time of normal use.

When the second transmission mode is made the so-called long distance transmission mode, the output of the carrier wave is made high or the frequency and the method of modulation of the transmission signal are changed so that the signal easily arrives over a long distance. Further, the transmission time of the signal becomes longer.

In addition, when the second transmission mode is made a broadcast mode, a broadcast signal indicating the location of the product is automatically added to the product historical information or solely transmitted. Here, the broadcast signal is a signal for widely broadcasting a specific message in the same way as the Morse code "SOS" being generally recognized as meaning a request for help.

By utilizing such a transmission mode changing function, this historical information recording device can be used for investigation of stolen goods, investigations of crimes, searches at the time of disasters, etc. For example, a stolen car will retain the content of the electrically recorded guarantee and a chassis registration number as they are even if the license plate is changed, so if this recorded data is read out at for example highway toll gate, it becomes easy to discover stolen cars and to help arrest criminals. Further, in the case of someone becoming lost or injured in the mountains, it would be possible to search for the historical information recording device provided in the backpack or radio by radio waves or the like and focus in on the area of response to find the party faster.

According to a sixth aspect of the present invention, there is provided a product provided with a historical information recording device for storing product historical information relating to manufacture, physical distribution, sale, registration, repair, and disposal and transmitting the information in response to a signal input from the outside, wherein said historical information recording device has a plurality of transmission modes and comprises a mode switcher for switching the transmission modes based on said input signal.

The product preferably has a product controller and the historical information recording device has a means for outputting to the product controller a startup signal for starting up a predetermined means in the product able to broadcast the location of the product when a broadcast request signal is included in the input signal. The mode switcher may also serve as the means.

This product has a high degree of safety against theft and loss due to the switching function of the transmission modes of the historical information recording device. Further, as examples of activating a means inside the product, it is possible to make the headlights of the automobile flash and make the horn sound continuously by remote control. Due to this, it is possible to broadcast the location of the product and also broadcast that there is trouble to the surroundings and thereby encourage quick rescue from the surroundings.

According to a seventh aspect of the present invention, there is provided a product management apparatus comprising: a historical information recording device in a product and the historical information recording device having a storage unit for storing product historical information relating to the manufacture, physical distribution, sale, registration, repair, and disposal of the product, further having a historical information tamper prevention unit for prohibiting a rewrite of the information stored in the storage unit under predetermined conditions to prevent tampering of the product historical information.

As a condition for prohibiting a rewrite by this historical information tamper prevention unit, for example it is possible to require that the password be different from the legitimate one; that the rewrite be after a predetermined number of rewrites; that the rewrite be tried after a predetermined number of rewrites; that the identification code of the terminal which emits the rewrite request be different from the identification code of the terminal at the initial time of writing first storing the product historical information; or that the write operation be requested after the elapse of a predetermined time from the first write operation.

The actual write prohibit operation may for example be to prohibit access to mode switching so as not to enter the write mode for rewriting or prohibit access for an address at which the product historical information has already been stored in the storage unit.

Further, it is possible to provide a rewrite history storage controller for discriminating and storing the rewrite historical information relating to the rewrites of the storage unit from the input signal so as to facilitate discovery of improprieties from the rewrite history.

According to a eighth aspect of the present invention, there is provided a product management apparatus comprising a historical information recording device in a product and said historical information recording device having: a storage unit for storing product historical information relating to the manufacture, physical distribution, sale, registration, repair, and disposal of the product, and a historical information destruction prevention unit for adding a predetermined limit on the read operations from the storage unit to prevent destruction of the product historical information by a read disturbance.

The historical information destruction prevention unit may limit the number of read operations or extend the time required for read operations from the storage unit after the predetermined number of read operations when the storage unit is comprised of a nonvolatile memory device.

With these recording devices of historical information, it is possible to limit the rewrites or read operations of the storage unit under the above conditions and there by effectively prevent tampering with or destruction of the product historical information.

According to a ninth aspect of the present invention, there is provided a product provided with a historical information recording device for storing in a storage unit product historical information relating to manufacturer, physical distribution, sale, registration, repair, and disposal, wherein said historical information recording device has a historical information tamper prevention unit for prohibiting rewrites of information stored in the storage unit under predetermined conditions to prevent tampering of the product historical information.

Preferably, the product has a product controller and the historical information recording device outputs a function stopping signal for stopping a predetermined function of the product to the product controller when the product historical information has been tampered with.

According to a 10th aspect of the present invention, there is provided a product provided with a historical information recording device for storing in a storage unit product historical information relating to manufacture, physical distribution, sale, registration, repair, and disposal, wherein said historical information recording device has a historical information destruction prevention unit for adding a limit to the read operations from the storage unit to prevent destruction of the product historical information due to read disturbances.

With these recording devices of historical information, since tampering and destruction are prevented, the product becomes high in reliability of the product historical information. Particularly, if there is tampering, the product itself stops functioning, so the value of the product falls at that point—which also helps keep down acts of tampering.

According to a 11th aspect of the present invention, there is provided a product provided with a historical information recording and/or reproducing device for recording and/or reproducing historical information to and from a specific historical information recorder in which specific historical information should be held, wherein the historical information recording and/or reproducing device comprises a discriminator for discriminating whether or not the recorder is the specific historical information recorder.

According to an 12th aspect of the present invention, there is provided a historical information recording and/or reproducing device for recording and/or reproducing specific historical information to and from a specific historical information recorder in which specific historical information should be held, comprising a discriminator for discriminating whether or not a recorder is the specific historical information recorder.

According to a 13th aspect of the present invention, there is provided a method of discriminating a historical information recording device, comprising the steps of: sending an inquiry signal from a historical information recording and/or reproducing device for recording and/or reproducing historical information to a historical information recorder in which the historical information should be held, sending a response signal in response to the sent inquiry signal from the historical information recorder to the historical information recording and/or reproducing device, and discriminating the historical information recorder by discriminating the response signal in a discriminator of the historical information recording and/or reproducing device.

According to the above configuration, since the historical information recording and/or reproduction device is provided with the discriminator for discriminating whether or not a recorder is the specific historical information recorder which should be covered, it is possible to identify the specific historical information recorder to be covered from among a plurality of historical information recorders.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, preferred embodiments of the present invention will be explained in detail by referring to FIG. 1 to FIG. 24.

Note that the following embodiments are preferred concrete examples of the present invention and are given technically preferred limitations, but the scope of the present invention is not limited to these embodiments unless it is specifically state that the present invention is thus limited in the following explanation.

First Embodiment

FIG. 1 to FIG. 4 show a radio cassette tape recorder as a product having the historical information recording device according to a first embodiment of the present invention.

Figure 1:
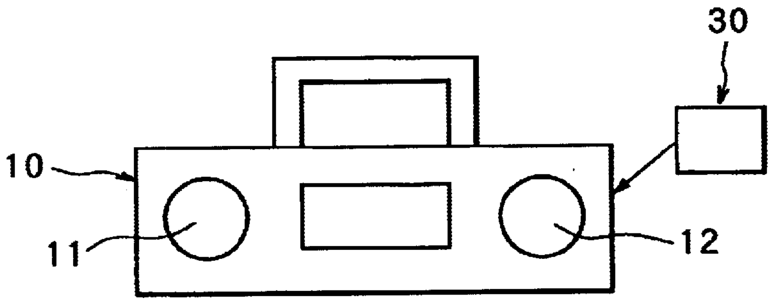
FIG. 1 is a schematic view of a product (radio cassette tape recorder) having a historical information recording device according to a first embodiment of the present invention.

In FIG. 1, a radio cassette tape recorder 10 has a well known configuration and reproduces sound from two speakers 11 and 12 by receiving a usual AM/FM broadcast or reproduces sound recorded on compact cassette tape.

The radio cassette tape recorder 10 has built in it a recording device 30 as the main unit of a historical information recording device 20. Note that this recording device 30 is the electronic guarantee (electronic history) and can be either initially built into the radio cassette tape recorder 10 or can be later attached to the outside of the product.

Figure 2:
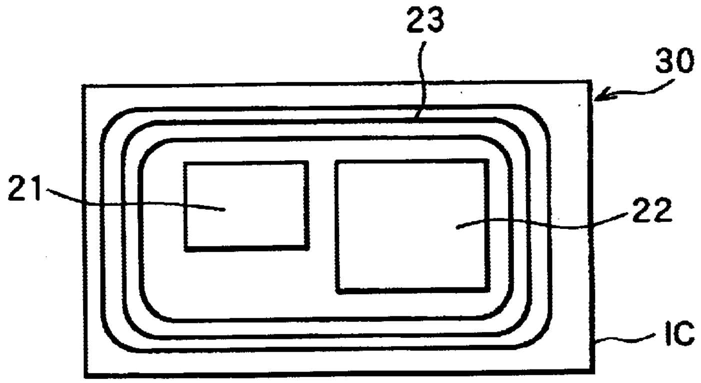
FIG. 2 is an enlarged plan view of a recording device in the product of FIG. 1.

This recording device 30 is a combination of for example a coil type antenna and a nonvolatile memory as shown in FIG. 2. The recording device 30 is provided with a first recording means 21 and a second recording means as the recording means and further a coil 23 as the input unit to these two recording means 21 and 22. Note that it is also possible to constitute this coil 23 so as to act also as an output use antenna.

The first recording means 21 is a read only memory (ROM), for example, a mask ROM, in which the historical information relating to the product, for example, the product name, model number, and data of manufacture is to be recorded.

The first recording means 21 is not limited to a ROM, an can be integrally constituted with the second recording means as a writable storage means in the same way as the second recording means 22 explained later.

The historical information relating to the product specifically includes the product name, manufacturing serial number, body color, place of production, production factory, production line number, date of manufacture, name of a person in charge of assembly, name of a person in charge of inspection of the product, date of shipment, etc.

Further, the second recording means 22 is a writable recording means, for example a flash memory or an EEPROM, in which the historical information after the shipment of the product, for example, the historical information relating to the sale or the historical information relating to the repair at the time of breakdown is to be recorded.

Note that the first and second recording means 21 and 22 are constituted as a single IC in the illustrated case, but clearly it is possible even if mounted as separate parts on a board.

Here, the historical information relating to the sale is specifically the date of sale, the name of the store, the name of the person in charge of the sale, the sales price, etc., while the historical information relating to the repair is specifically for example the date of repair, content of repair, and the same of the person in charge of the repair.

Note that, as the historical information, it is possible to write for example the distribution process from the shipment to the sale, that is, the dates of arrival at the intermediate wholesalers, the dates of shipment from them, the names of the wholesalers, and other distribution historical information.

Figure 3:
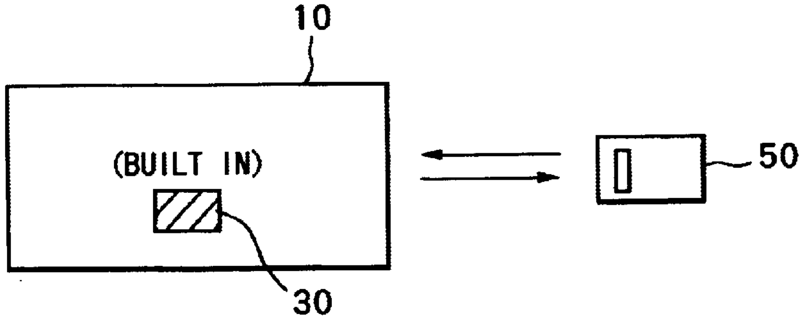
FIG. 3 is a schematic view of a state where a historical information recording device according to the present embodiment is provided in a product.

FIG. 3 is a view of a state where the historical information recording device 20 according to the present embodiment is built into a product.

In the figure, the recording device 30 of the historical information recording device 20 is installed inside the radio cassette tape recorder 10 as for example the electronic guarantee of the product, that is, the radio cassette tape recorder 10. Further, a remote controller, that is, the remote control device 50, is provided as the outside unit of the historical information recording device 20. This remote control device 50 is not built into the radio cassette tape recorder 10 unlike the recording device 30, but is separately constituted from the radio cassette tape recorder 10 and the recording device 30.

The historical information recorded in the recording device 30 is transmitted between the recording device 30 and the remote control device 50 by a non-contact method.

Figure 4:
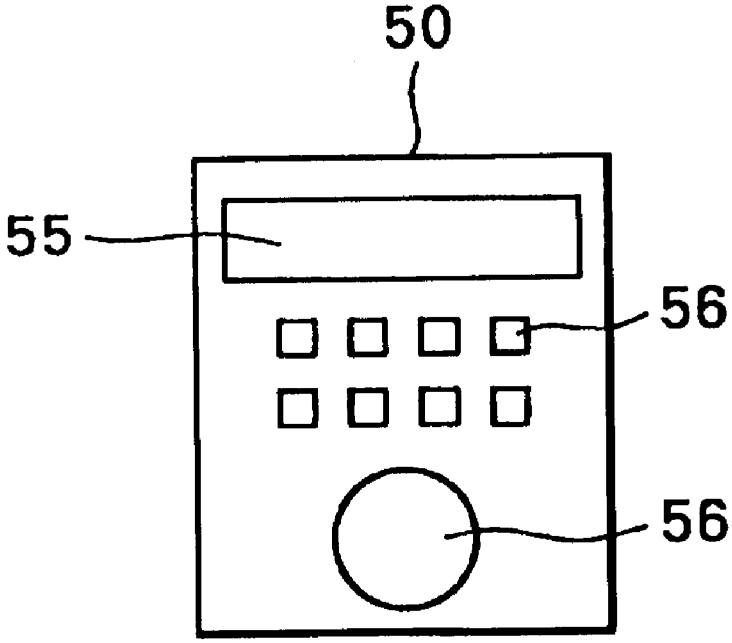
FIG. 4 is an enlarged view of a remote control device shown in FIG. 3.

FIG. 4 is an enlarged view of the remote control device 50 shown in FIG. 3. In the figure, the remote control device 50 is provided with a liquid crystal display 55 for displaying the historical information transmitted from the recording device 30. Further, this remote control device 50 is provided with input keys 56 and 56 for inputting various instructions from the user.

Figure 5:
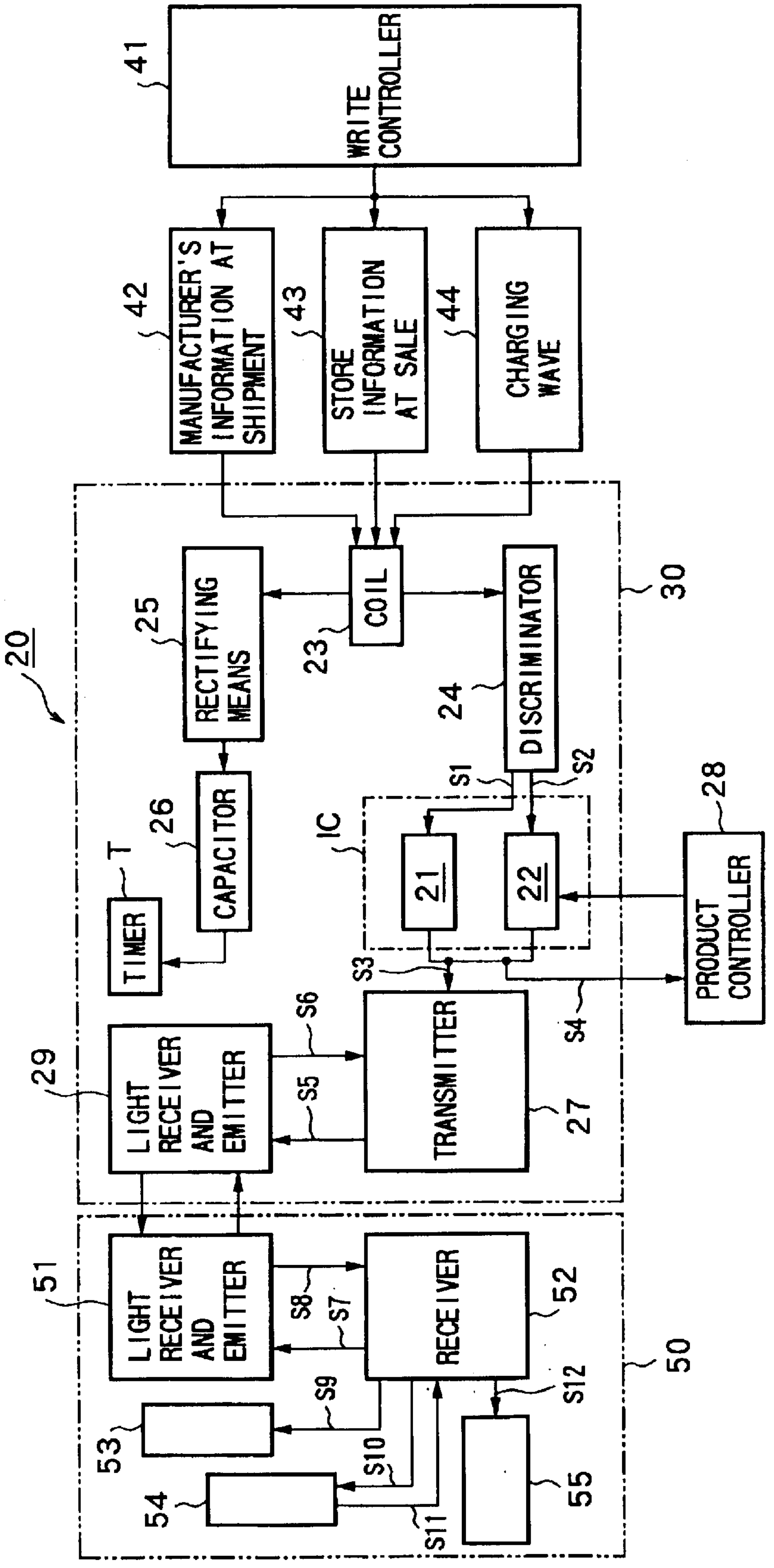
FIG. 5 is a view of an electrical configuration of the historical information recording device according to the first embodiment.

FIG. 5 shows the electrical configuration of the historical information recording device 20.

In the figure, the historical information recording device 20 includes the recording device 30 and the remote control device 50 as the outside unit. On the right side of this recording device 30 in the figure are arranged a write controller 41 for inputting the historical information to this recording device 30 and transmitters 42, 43, and 44 serving as the writing means.

Note that, in the figure, these transmitters 42, 43, and 44 are arranged separated from each other, but it is not always necessary that they be arranged separated from each other.

Upon instruction from the write controller 41, for example, the historical information, for example, the manufacturer's information on the date of shipment relating to the product is transmitted as for example a magnetic field modulated signal to the input unit of the recording device 30, that is, the coil 23, via the manufacturer shipment information transmitter 42.

Further, for example, the store information at sale relating to the sale is transmitted as for example a magnetic field modulated signal to the coil 23 via the sale information transmitter 43 of the store.

Further, when transmitting a charging radio wave to the coil 23 via the charging radio wave transmitter 44 by the instruction from this write controller 41, the current generated in the coil 23 of the recording device 30 is rectified by a rectifying means 25, then charged in a capacitor 26. This makes an internal battery unnecessary.

Further, it is also possible to provide a storage battery, store electric power in it, and appropriately utilize this power.

The first and second recording means 21 and 22 of the recording device 30 of the historical information recording device 20 are connected to the coil 23 via a discriminator 24.

This discriminator 24 functions to discriminate the type of the information input to the coil 23 and input this to the determined recording means.

Accordingly, as mentioned above, when the historical information, that is, the manufacturer shipment information and the store information at sale, is input to the coil 23 as the radio wave via the transmitters 42 and 43, an induction current will be created in this coil 23 based on this radio wave and this current will be input to the discriminator 24.

The discriminator 24 discriminates this historical information and where it is historical information relating to the product, as indicated by S1, outputs this information to the first recording means 21. Further, where this historical information is historical information relating to sale, as indicated by S2, it outputs this information to the second recording means 22.

In this way, the historical information is output to the first and second recording means 21 and 22 where it is recorded.

Further, the recording device 30 of the historical information recording device 20 is provided with a transmitting means for transmitting the historical information to the remote control device 50 mentioned later, that is, a transmitter 27 and a light receiver and emitter 29.

Namely, as shown in FIG. 5, the historical information recorded in the first and second recording means 21 and 22 is first sent to the transmitter 27 as indicated by S3.

Then, when the light receiver and emitter 29 having a light receiving and emitting element of the recording device 30 receives for example an optical signal from the light receiver and emitter 51 of the remote control device 50 mentioned later, a signal indicating the reception of the light is sent to the transmitter 27 as indicated by S6.

After receiving this signal, the transmitting 27 transmits the historical information to the light receiver and emitter 29. The light receiver and emitter 29 sends this historical information to the light receiver and emitter 51 of the remote control device 50 by a non-contact method in the form of an electromagnetic wave, for example, an optical signal.

Further, in the present embodiment, the historical information from the first and second recording means 21 and 22 is preferably also output as S4 to the product controller 28 provided in the product, that is, the radio cassette tape recorder 10.

Here, the product controller 28 is preferably set up so that it reads the historical information relating to sale from the second recording means 22. When this historical information, particularly the information of the date of sale, is not written, it prevents the product, that is, the radio cassette tape recorder 10, from operating.

Due to this, improper actions such as deliberately not writing the date of sale on the written guarantee as in the conventional case are prevented. Further, since the historical information relating to the sale is not written, at the time of theft, the product, that is, the radio cassette tape recorder 10, will not operate, so there is the effect of suppressing theft.

Further, the product controller 28 preferably is designed to write the starting date of operation in the second recording means 22 when the product, that is, the radio cassette tape recorder 10, is first operated. Due to this, it is possible to prevent the guarantee period from being improperly extended even when the example particularly the information of the date of sale is not written in the second recording means 22.

In this case, at the point of time for example when the historical information relating to the sale is written in the second recording means 22, a signal is input to a timer T from the capacitor 26. The timer T counts the time from the time of sale, so the starting date of operation can be easily determined.

In the present embodiment, the device is constituted so that the historical information is transmitted as for example a radio wave from the external write controller 41 via the transmitters 42, 43, and 44, but the present invention is not limited to this. It is also possible to transmit it by a non-contact method by for example, light, which is an electromagnetic wave the same as a radio wave, by voice, by an image, or by an electric signal.

Particularly, in a case where the historical information is written by optical transmission, it is possible to correctly record information in a manner more resistant to noise compared with a radio wave.

Further, the historical information recording device 20 has an outside unit, that is, the remote control device 50, together with the recording device 30.

As shown in FIG. 5, the remote control device 50 is provided with a receiving means for receiving the historical information from the light receiver and emitter 29 of the recording device 30, that is, the light receiver and emitter 51 and a receiver 52. This light receiver and emitter 51 is provided with for example a light receiving and emitting element in the same way as the light receiver and emitter 29 of the recording device 30.

When the user wants to read the historical information recorded in the first and second recording means 20 and 21 of the recording device 30, he or she reads it by operating this remote control device 50.

This operation is transmitted to the receiver 52, then the signal is sent from this receiver 52 to the light receiver and emitter 51 as indicated by S7 of the figure. The light receiver and emitter 51 receiving this signal emits for example an optical signal to the light receiver and emitter 29 of the recording device 30.

The light receiver and emitter 29 of the recording device 30 receiving the optical signal from this light receiver and emitter 51 sends this historical information by a non-contact method to the light receiver and emitter 51 of the remote control device 50 in the form of an electromagnetic wave, for example, an optical signal as mentioned above.

The historical information received by the light receiver and emitter 51 in this way is sent to the receiver 52 as indicated by S8 of the figure.

When the historical information sent in this way finishes being received, the receiver 52 transmits the signal to an end sign unit 53 as indicated by S9 of the figure. This end sign unit 53 is provided with for example a light emitting diode, therefore when receiving this signal, this light emitting diode will flash. By this end sign unit 53 turning on, the operator of the remote control device 50 can confirm the end of the reception of the historical information.

This receiver 52 transmits the received historical information to a memory unit 54 and make this record the historical information as indicated by S10 of the figure.

In this way, the historical information recorded in the memory unit 54 is transmitted to for example the display, that is, the liquid crystal display 55, after passing from the memory unit 54 to the receiver 52 as indicated by S11 and S12 of the figure by the instruction of the receiver 52 when the operator operates the remote control device 50.

This liquid crystal display 55 is formed in the remote control device 50 as shown in FIG. 4. The historical information is displayed on this display 55.

The radio cassette tape recorder 10 provided with the historical information recording device 20 according to the present embodiment is constituted as described above. The radio cassette tape recorder 10 per se is used as a usual radio cassette tape recorder.

Further, the radio cassette tape recorder 10 is provided with the historical information recording device 20. The historical information relating to the product and the historical information relating to the sale are written in the first recording means 21 and the second recording means 22, so it acts as what may be called an electronic (optical, magnetic) guarantee.

Accordingly, according to the present embodiment, in order to read the historical information recorded in the recording device 30 of the historical information recording device 20, the user reads the information by a non-contact method by using a portable remote controller which can be carried by the user or another remote control device 50. For this reason, even if the product 10 itself is large in size and hard to move, the historical information can be easily read by carrying the remote control device 50.

Further, it is not necessary to provide the liquid crystal display 55 for displaying the historical information in the product 10 itself, therefore the manufacturing cost can be lowered.

Further, the guarantee will never become lost or never become illegible due to its state of storage like with a conventional separately attached guarantee made of paper. The user is therefore able to obtain free repair based on the guarantee within the predetermined guarantee period.

On the other hand, at the manufacturer's side, historical information relating to the sale is recorded in the second recording means 22, so the date of sale is reliably specified and therefore correct management of the guarantee period becomes possible.

Further, the second recording means 22 of the recording device 30 can be written with historical information relating to repair and further historical information relating to distribution. Due to this, it becomes possible to easily determine the repair history for individual products and possible for the manufacturer to easily manage statistics on the service life of the product and the frequency of breakdown.

Here, since the historical information is written in the recording device 30 by a non-contact method using a radio wave, it is possible to easily write the information even after the assembly of the product or after packaging the product, that is, radio cassette tape recorder 10, to write the information with respect to each product one by one, and to write information with respect to a plurality of products all at once.

Second Embodiment

Figure 6:
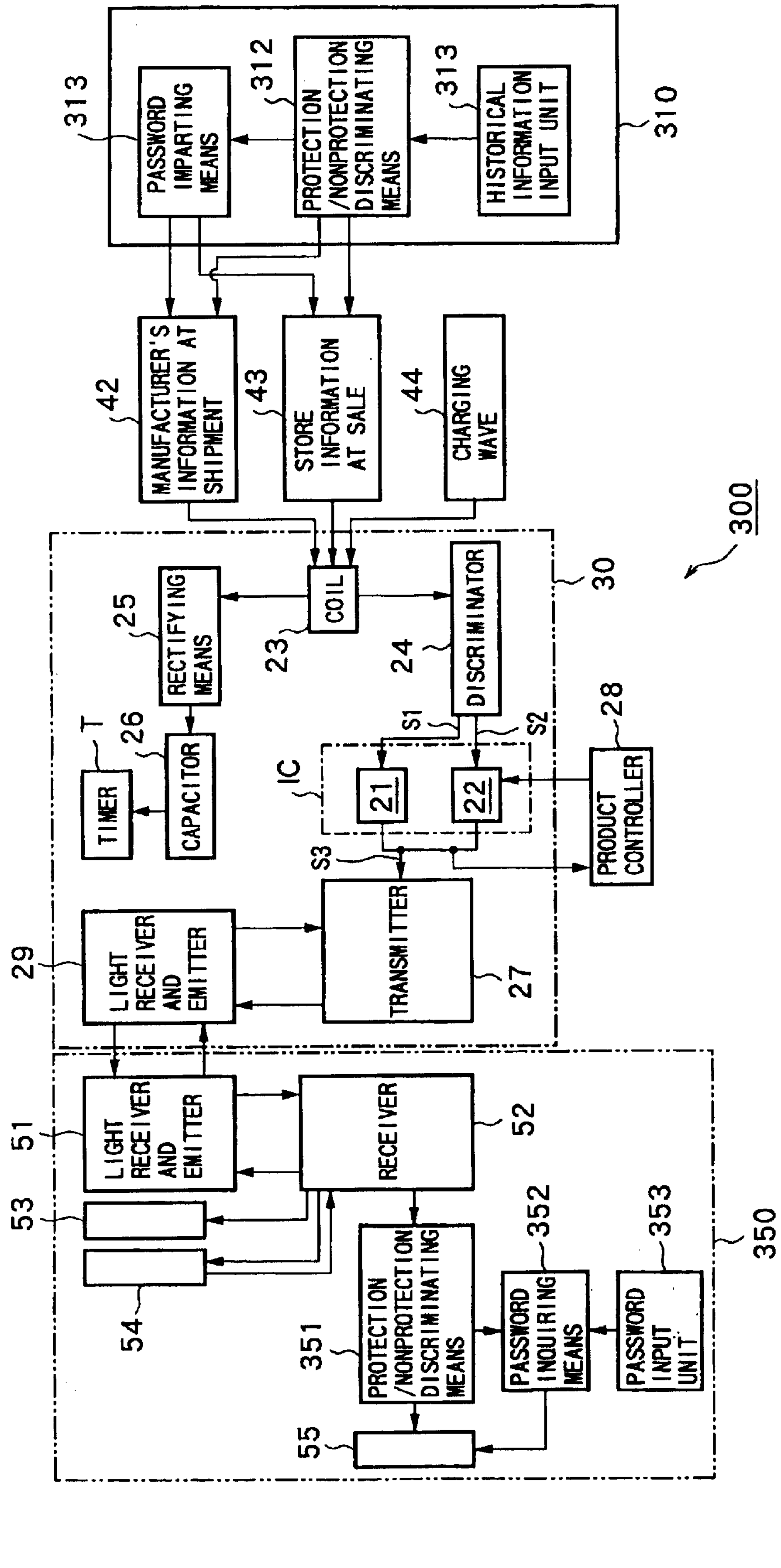
FIG. 6 is a block diagram of the electrical configuration of the historical information recording device according to a second embodiment of the present invention.

FIG. 6 is a block diagram of the electrical configuration of the historical information recording device according to a second embodiment of the present invention.

The recording device 30 of a historical information recording device 300 has a similar configuration to that of the first embodiment and is for example attached to the product. In the present embodiment, however, unlike the first embodiment, at the input of the historical information to the recording device 30 of the historical information recording device 300, a password is imparted for at least part of the historical information.

Since a password is given for at least part of the input historical information, a configuration corresponding to this is given also to the outside unit, that is, the remote control device 350.

Accordingly, in the present embodiment, similar parts as those in the first embodiment are given the same reference numerals and explanations thereof are omitted. The explanation will be made focusing on the parts having a different configuration.

In FIG. 6, a write controller 310 is provided with a historical information input unit 311 for receiving as input the historical information from the outside. The historical information input to this historical information input unit 311 is sent to a protection/non-protection discriminating means 312.

In this protection/non-protection discriminating means 312, among the historical information input to the historical information input unit 311, the information which must not be revealed to others, for example, the records of repair, is processed as protected information. Specifically, the information is flagged at the time of input to the historical information input unit 311, therefore the flagged historical information data is discriminated as the protected information.

This protected information is sent to a password imparting means 311, given the predetermined password, and then transmitted to the recording device 30 via the writing means, that is, the transmitters 42 and 43. On the other hand, the non-protected information is not given a password and is transmitted to the recording device 30 via the writing means, that is, the transmitters 42 and 43.

Accordingly, the first and second recording means 21 and 22 of the recording device 30 store the protected information in a password-guarded state.

For this reason, the remote control device 350 having the function of receiving and reading the historical information is provided with a means for comparing this password.

Namely, the recording device 350 in the figure is provided with a protection/non-protection discriminating means 351, a password comparing means 352, and a password inputting means 353 between the receiver 52 and the liquid crystal display 55 unlike the first embodiment.

For this reason, the historical information sent to the receiver 52 is first sent to the protection/non-protection discriminating means 351. The information discriminated as the non-protected information at this protection/non-protection discriminating means 351 is sent to the liquid crystal display 55 as it is.

On the other hand, the information discriminated as protected information at this protection/non-protection discriminating means 351 is sent to the password comparing means 352. Further, the user inputs for example numerals as the password by the input key 56 (refer to FIG. 4) provided in the password input unit 353 of the remote control device 350.

Then, the password comparing means 352 compares the password attached to the protected information and the input password and, if passwords coincide, sends the information to the liquid crystal display 55.

Where these passwords do not coincide, it does not send the information to the liquid crystal display 55.

In this way, in the present embodiment, the protected information in the historical information cannot be read unless the user inputs the correct password to the password input unit 353, therefore even if the remote control device 350 ends up being erroneously handed to others, the protected information will not be read. Accordingly, it is possible to effectively prevent others from reading the content of the historical information.

Third Embodiment

Figure 7:
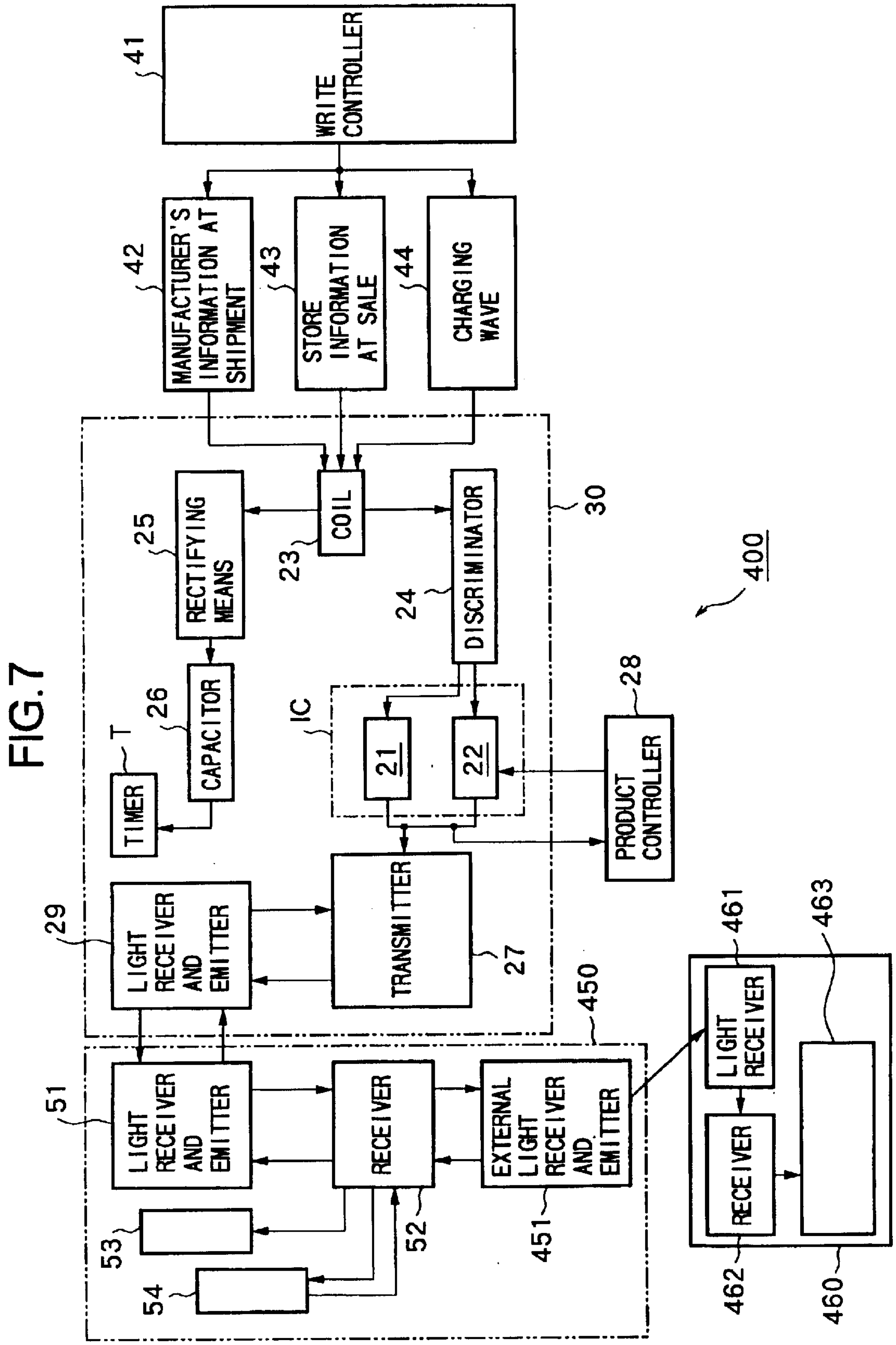
FIG. 7 is a block diagram of the electrical configuration of the historical information recording device according to a third embodiment of the present invention.

FIG. 7 is a block diagram of the electrical configuration of the historical information recording device according to a third embodiment of the present invention.

The recording device 30 of a historical information recording device 400 has a similar configuration to that of the first embodiment and is attached to for example a product. In the present embodiment, however, unlike the first embodiment, the configuration of the outside unit, that is, a remote control device 450, is different. Further, the historical information is displayed on another display, for example, a display screen 463 of a television 460.

Accordingly, in the present embodiment, similar parts as those in the first embodiment are given the same reference numerals and explanations thereof are omitted. The explanation will be made focusing on the parts having a different configuration.

In FIG. 7, the remote control device 450 is not provided with the liquid crystal display unit 55 unlike the first embodiment, but is provided with an external light receiver and emitter 451 in place of this.

The configuration of this external light receiver and emitter 451 is substantially the same as that of the light receiver and emitter 51 of the first embodiment. The difference thereof resides in that the other end of the optical transmission is not the recording device 30, but the television 460.

Namely, the remote control device 450 receiving the historical information from the recording device 30 will further optically transmit this historical information to the television 460 from the receiver 52 thereof through the external light receiver and emitter 451.

This optically transmitted historical information is sent to a light receiver 461 having a light receiving element provided in the television 460 and further displayed on the display screen 463 via the receiver 462.

Accordingly, it is not necessary to provide the liquid crystal display 55 in the remote control device 450 as in the first and second embodiments, so the manufacturing cost of the historical information recording device 400 can be lowered.

Further, if the function of the remote controller of the television 460 is added to this remote control device 450, this remote control device 450 can also be used as the remote controller of the television 460.

Further, the remote control device 450 according to the present embodiment has the memory unit 54, so can receive the historical information of recording devices 30 etc. installed in a plurality of products 10 and record the same in the memory unit 54 by a single remote control device 450.

Figure 8:
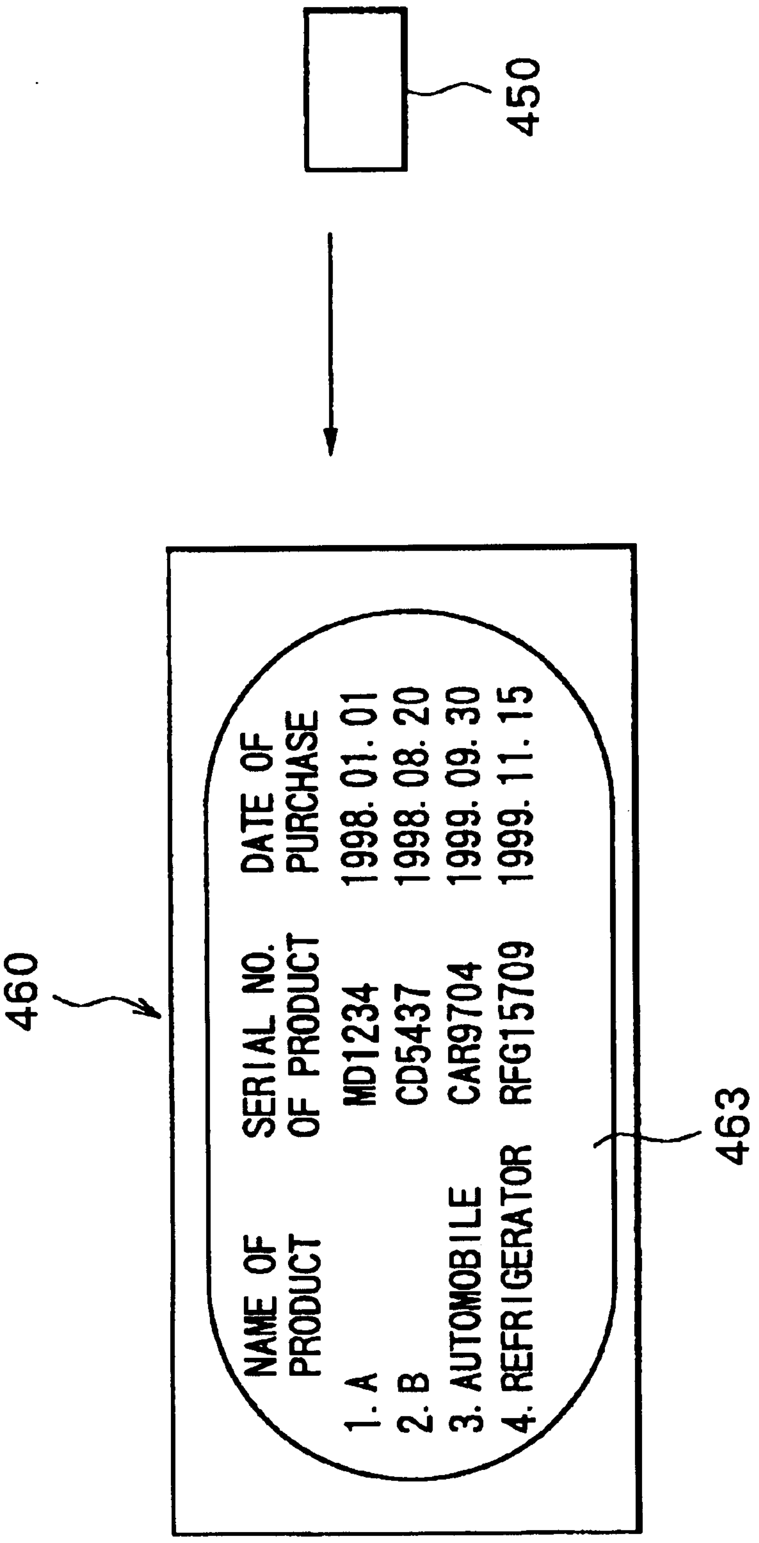
FIG. 8 is a view of a state where historical information of a plurality of products are simultaneously displayed on a display screen.

If the historical information is simultaneously transmitted to the television 460, as shown in FIG. 8, historical information of a plurality of products 10 etc. can be simultaneously displayed on the display screen 463. By this, the management of the products 10 etc. becomes easier.

In the present embodiment, the historical information was transmitted to the television 460 for display, but the present invention is not limited to this. It is also possible to transmit the historical information to a printing device such as a printer and print the same. In this case, the historical information relating to a plurality of products 10 etc can be managed and stored together.

Fourth Embodiment

FIG. 9 is a view of a radio cassette tape recorder as an embodiment of the product provided with the historical information recording device according to a fourth embodiment of the present invention.

In FIG. 9, the basic functions of this radio cassette tape recorder 501 are well known. It usually receives an AM/FM broadcast or reproduces recorded sound from a compact cassette tape and emits these from the two speakers 502 and 503.

Figures 9A, 9B:
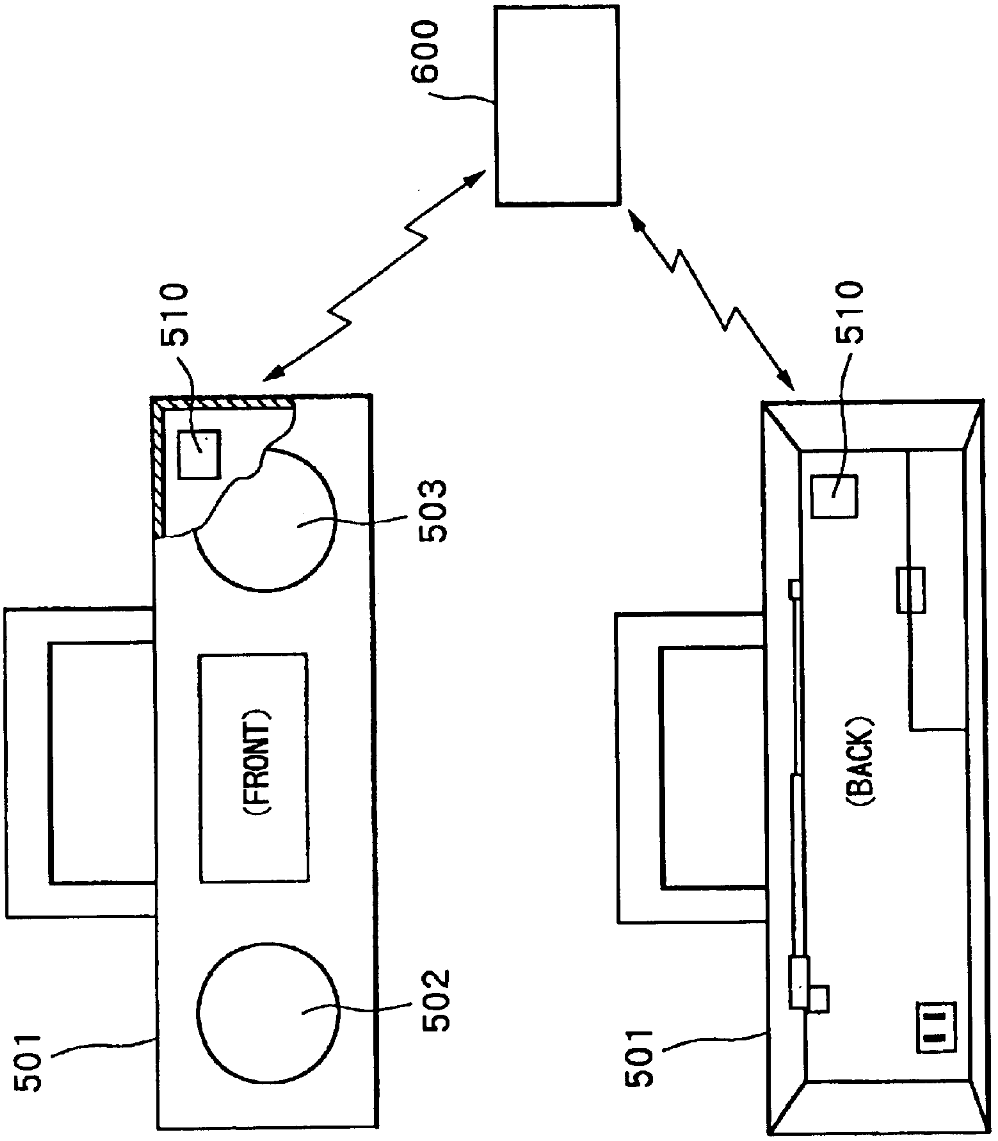
FIGS. 9A and 9B are views of a radio cassette tape recorder as an example of the product provided with the historical information recording device according to the embodiments of the present invention.

The difference of the radio cassette tape recorder 501 of the present embodiment from a usual one resides in the provision of the historical information recording device 510. This historical information recording device 510 can be either built into the product as shown in FIG. 9A or affixed to the outside as shown in FIG. 9B.

The historical information relates to the manufacture, physical distribution, sale, registration, repair, or disposal of the product (here, a radio cassette tape recorder).

The historical information may be any information, but giving concrete example, when relating to manufacture, may include for example the name of the product, the manufacturing serial number, body color, production factory, production line number, date of manufacture, name of the person in charge of assembly, name of the person in charge of inspection of the product, date of shipment, etc. When relating to the physical distribution, it may include for example the name of the wholesaler, date of arrival, data of shipment, and name of the retail store shipped to. When relating to the sale, it may include for example the date of sale, name of the store, name of the person in charge of the sale, and the sale price. Further, relating to repair, it may include for example the date of repair, content of repair, and the name of the person in charge of the repair.

Note that, relating to registration and disposal, while there is as yet no generalized system of registration or application for disposal of consumer electronics as in the present example, when the product is for example an automobile, the historical data relating to the registration may include the car registration number, the name of the person who registers it, etc. and the historical data relating to the disposal may include, in addition to the car registration number, the person who applied for the disposal and so.

When recording of reading out this data to or from the historical information recording device 510, as shown in FIG. 9, for example the sales staff or the person in charge of repair does this by a non-contact operation by remote control using a terminal (write/read terminal) 600 assigned to him or her, that is, transmission and reception by radio wave. Due to this, there is the advantage that a sales staff in particular can write such data (for example, record the data of sale) while the product is packaged.

Figure 10:
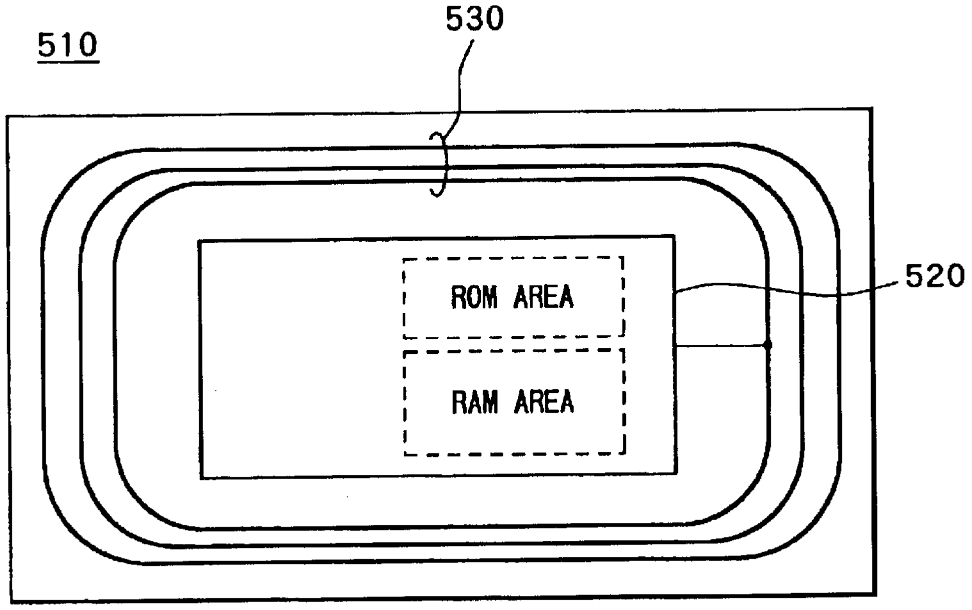
FIG. 10 is a view of an outer appearance of the historical information recording device formed as an chip IC according to an embodiment of the present invention.

FIG. 10 is a view of the appearance of the historical information recording device 510 formed as a chip IC.

The historical information recording device 510 of this illustrated example has an IC 520 on which a transmission and reception circuit, the memory unit, and various peripheral circuits are integrated and a coil type antenna (hereinafter, referred to as a coil antenna) 530 for transmitting and receiving the radio wave. This historical information recording device 510 is characterized in that it can operate with not power supply since it receives electric power by the radio wave from the coil antenna 530 and in that it has a small size and light weight since all of the required circuits are contained in one IC.

Note that the historical information recording device 510 of the present example having such a characteristic feature can be mounted on, other than apparatuses using electricity such as the electrical equipment and transport equipment, even equipment generally not using electricity, for example, recreational boats, surfboards, ski jackets, backpacks, climbing shoes, and other sporting goods and daily goods.

Figure 11:
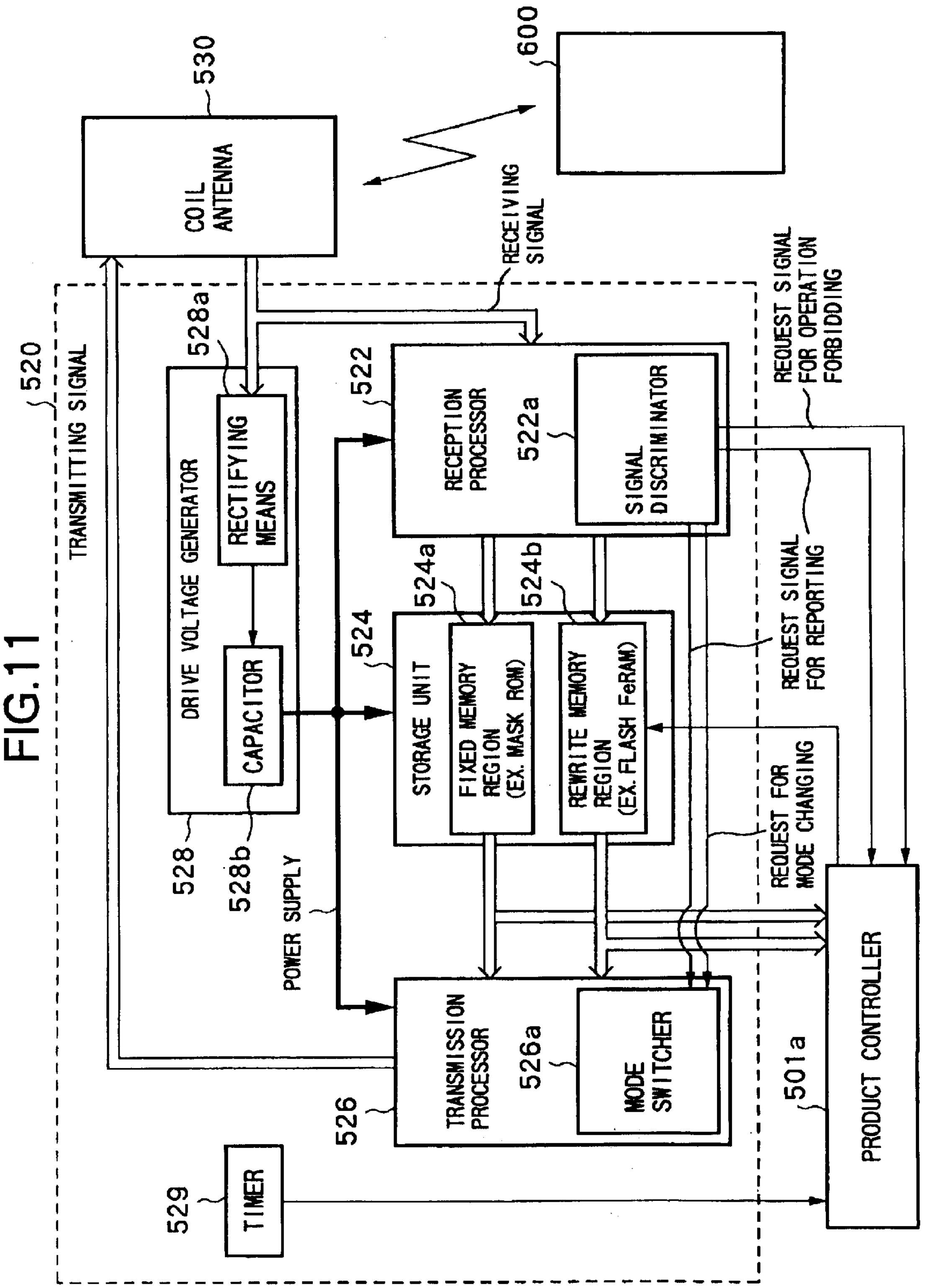
FIG. 11 is a block diagram of a detailed internal configuration of the IC together with a write/read terminal etc. in a historical information recording device according to a fourth embodiment of the present invention.

FIG. 11 is a block diagram of the detailed internal configuration of the IC together with the write/read terminal etc. in the historical information recording device of FIG. 10.

In FIG. 11, the circuit inside the IC roughly comprises a reception processor 522 for demodulation, discrimination, etc. of the received signal, a storage unit 524 for storing the data, a transmission processor 526 for modulation etc. of the read stored data, and a drive voltage generator 528 for generating drive voltages of these units 524 to 526 from a radio wave input from the coil antenna 530. Other than this, generally there is a controller, for example, CPU, but these are omitted in the figure. Further, in the present example, a timer 529 is built in for the control of the product, mentioned later.

The reception processor 522 has a signal discriminator 522*a* for discriminating the received signal after demodulation. As the main function of this signal discriminator 522*a*, first there is classification of the historical data by discriminating the received signal, specifically distinguishing whether it is rewrite data to be rewritten or fixed data which cannot be rewritten. Second, when the received signal contains a mode switch signal, the signal is sent to the transmission processor side. Third, where the received signal contains a broadcast request signal, a signal is sent to the transmission processor side and a predetermined part in the product. Fourth, a signal indicating the prohibition of operation or startup to the product is sent to a predetermined part in the product.

The storage unit 524 has a fixed memory region 524*a*, a rewrite memory region 524*b*, and a peripheral circuit for writing or reading the data to and from specific addresses of these memory regions. The fixed memory region 524*a* can be a mask ROM or the like too if the write data is known at the manufacturing stage, but usually a one-time programmable read only memory (OTPROM) which can be written with data from the outside only one time is preferred. The rewrite memory region 524*b* is preferably a rewritable nonvolatile memory, for example, flash EEPROM or FeRAM. Note that where these are constituted as one chip as in the present example, in order to avoid a troublesome manufacturing process, it is also possible to constitute all of them by for example flash EEPROMs and provide a means for prohibiting the writing for only the fixed memory region 524*a*.

The transmission processor 526 has a plurality of transmission modes and has a mode switcher 526*a* for switching among these transmission modes. The switching of this transmission mode is the characteristic feature of the present invention. The mode switcher 526*a* sets the first transmission mode at the time of normal use. When a mode switch signal or a broadcast request signal is input from the signal discriminator 522*a*, it switches the transmission mode from the first transmission mode to the second transmission mode. Specific examples of the transmission mode will be explained later.

The drive voltage generator 528 converts the input radio wave from AC to DC. Various configurations exist, but here, as the general configuration, only a rectifying means 524*a* and a capacitor 528*b* are shown. The capacitor 528*b* is provided to further smooth the rectified waveform, temporarily store the drive voltage, and stabilize the drive voltage value. Note that, when one electrode of this capacitor 528*b* is connected to the timer 529, the drive voltage is first supplied, and the held voltage value falls, this may be given to the timer 529 as the trigger of the time count.

Note that the historical information recording device 510 of the present example is connected to the product controller 501*a*, for example, a microcomputer provided inside the product. Specifically, it is connected so that it can receive as input a clock signal from the timer 529, historical data read from the storage unit 524, etc. at the product controller 501*a*. Conversely, it is connected so that the product controller 501*a*, it is connected so that the time when the product was used first can be recorded in the rewrite memory region 524*b* from the product controller 501*a*. Further, although a detailed description will be given later, it is connected so that the broadcast request signal, operation prohibit request signal, and startup signal can be input from the signal discriminator 522*a*.

Next, an example of the operation of the historical information recording device 510 having such a configuration will be explained.

Figure 12:
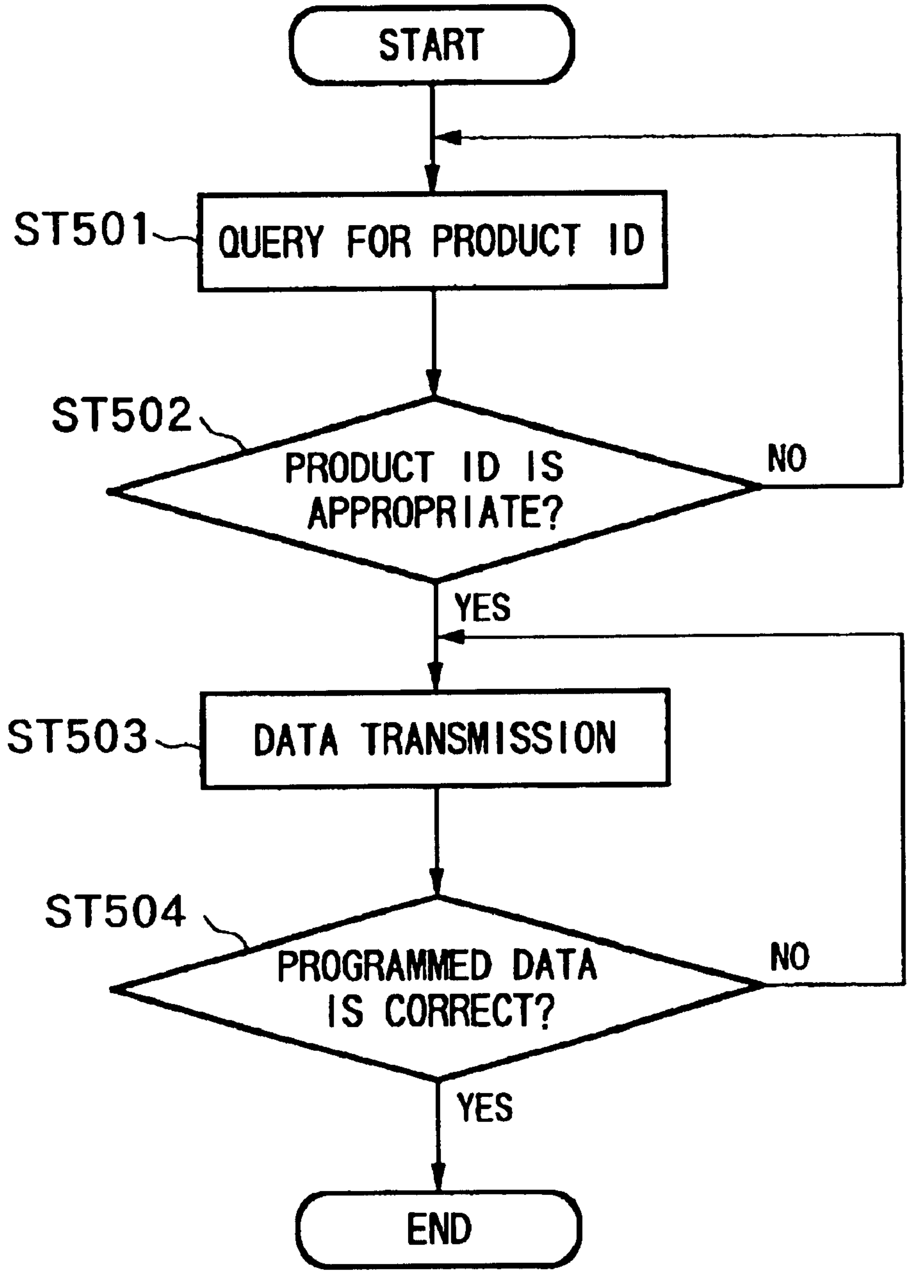
FIG. 12 is a flow chart of an example of a write and a read routine of the historical information.

FIG. 12 is a flow chart of the write procedure of the historical data.

In this figure, a case is shown where the identification number ID (for example, manufacturing serial number) of the product is read from the fixed memory region 524*a*, whether the product is a product of the company and other suitability is judged, then the historical data relating to the sale is recorded in the rewrite memory region 524*b*. Such a judgement of suitability by ID does not have to carried out for every write operation of the historical data, but here it will be explained together as an example of a read operation.

First, at step ST501 of FIG. 12, for example, the sales staff operates the write/read terminal 600 to ask for the identification number ID of the product.

Specifically, a read request signal is transmitted from the write/read terminal 600. This is received at the coil antenna 530 by the historical information recording device 510. The reception signal (read request signal) is input to both of the drive voltage generator 528 and the reception processor 522 in the configuration of for example FIG. 11. At the drive voltage generator 528, the induction current generated by the reception of the signal by the coil antenna 530 is rectified at the rectifying means 528*a*, an electric charge is accumulated in the capacitor 528, then the voltage thereof is sent as the drive voltage to the units 522 to 526. When the reception processor 522 receiving the drive voltage is started up, the input reception signal is demodulated there, then the content of the read request, that is, the request for reading the identification number ID, is discriminated by the signal discriminator 522*a*. Then, when a read operation of the identification number ID is instructed to the storage unit 524, the identification number ID stored at the predetermined address of the fixed memory region 524*a* of the storage unit 524 is read and is sent to the transmission processor 526. The identification number ID is modulated at the transmission processor 526, then transmitted to the write/read terminal 600 via the coil antenna 530.

At step ST502, it is decided if the product in which the data is to be written is appropriate based on the identification number ID.

Specifically, the write/read terminal 600 receiving the signal from the historical information recording device 510 demodulates the reception signal and confirms that the identification number ID was sent, then judges if the identification number ID of the product which is going to be sold indicates the correct manufacturing serial number of the correct manufacturer by comparing this with a list etc. registered in advance. When it is judged that the product is not proper, the identification number ID is asked again. If the result is the same even when this is repeated a predetermined number of times, the related product is discriminated as an illicit product and the sale is stopped.

On the other hand, where it is decided that the product is proper, at step ST503, the predetermined historical data (for example, sale date of product and name of store) and the write request signal are transmitted to the historical information recording device 510.

The historical information recording device 510 receiving this write request signal demodulates the reception signal by generating a drive voltage in the same way as the case of the reading mentioned above. The signal discriminator 522*a* discriminates the content of the historical information for which the writing is requested and the designated memory region (and address) based on the demodulated write request signal. Then, the storage unit 524 is used to write the historical information in the rewrite memory region 524*b* of the predetermined address (or designated address). Subsequently, the storage unit 524 reads the written historical data for verification, transmits the data to the transmission processor 526 in the same way as the above, then transmits the same to the write/read terminal 600 again.

The write/read terminal 600 receiving this signal verifies at the next step ST504 if the data has been correctly written. Where it is not correct ("NO"), the write request signal is transmitted again and the writing is carried out, then the write data is read and verified as mentioned above. The data write, read, and verification are repeated until it is decided that the data is correct.

When the result of the verification is that it is correct ("YES"), the related write processing is terminated.

In this way, in the present example of the operation, the identification number can be compared before the writing of the historical data in the historical information recording device. Due to this, detection of illicit goods becomes easy and reliable sale activities become possible.

Note that in this way, not only the detection of illicit goods, but also the prevention of the operation of illicit goods as a strong deterrent become possible. For example, like in the above operational example, where goods are decided to be illicit by a comparison of the identification signal, if an operation prohibit request signal is transmitted from the write/read terminal 600 side, the signal discriminator 522*a* discriminating this sends this operation prohibit request signal to the product controller 501*a* so as to prohibit the operation of the product.

The above description is an example of the routine for sales staff to write the date of sale or other historical data, but the write operation and read operation of the basic data are common for manufacture, physical distribution, registration, repair, and disposal.

For example, in the case of repair, it is necessary to read the date of sale from the historical information recording device, decide whether or not the product is within the repair period, and determine whether the repair is free within the guarantee period or to be charged since the guarantee period has already passed. The read operation at this time can be carried out in the same way as the above example (reading of the identification number). Also, the writing of the repair data can be carried out in the same way as the above example.

In the case of repair, if the date of sale is not described, the manufacturer and the business contracting to perform the repair sometimes must repair a product for which the guarantee period has passed and therefore incur a loss, but in the present invention, since the guarantee is electronically provided, it is possible to establish the rule that lack of entry of the date of sale is improper. In this case, so far as the name of the store is stored, the date of sale can be inquired about. Even in a case where the name of the store is not stored, so far as various information about the distribution channel is stored, it also becomes possible to identify the store which took the improper action through the production factory and the wholesaler based on the manufacturing serial number etc.

For this reason, the manufacturer or the business performing the repair no longer need incur a loss as in the conventional case.

Further, it is also desirable that the product controller 501*a* discriminate that there is no data which should naturally have been written if the product had been legitimately sold (name of the store, data of sale, etc.) and not permit the operation of the product. This helps suppress theft.

Historical data relating to the manufacture and physical distribution can be similarly written and read. Note that, relating to registration and disposal, while there is usually no system of registration or application for disposal for consumer electronics, in a case where the registration is necessary like for example an automobile, it is possible to easily discover improprieties simultaneously with the writing and the reading of the historical data and take steps such as the prohibition of the operation.

On the other hand, even in a case where the date of sale is not recorded as described above, the product of the present example can utilize the timer in the historical information recording device 510 to determine and write the data when the product started to be operated, for example, the date when power was first supplied to the product, in place of the date of sale. This is because generally a product is first operated within a few days from the sale of the product. Due to this, the repair side can determine whether to perform the repair at a charge or free with reference to this starting date of operation.

Note that the power supply voltage of the timer can be obtained from the voltage held by the drive voltage generator 528 too if the power consumption thereof is small, but if it is not small, it is necessary to separately provide a special battery or obtain electric power from the battery in the product. Further, it is also possible to activate the timer before the power is first turned on in the product. In this case, for example, a fall in the held voltage of the capacitor 528*b* may be used to trigger the time count.

In the write (or read) routine for the historical data explained above, the signal was repeatedly transmitted a number of times. In most cases, for all of manufacture, physical distribution, sale, registration, repair, and disposal, usually the person in charge operates the terminal to write the historical data near the product.

The historical information recording device of the present invention is characterized that it has the function of switching the mode of the signal transmission so as to enable the operation of the historical data to be carried out from for example a far position as well.

Figure 13:
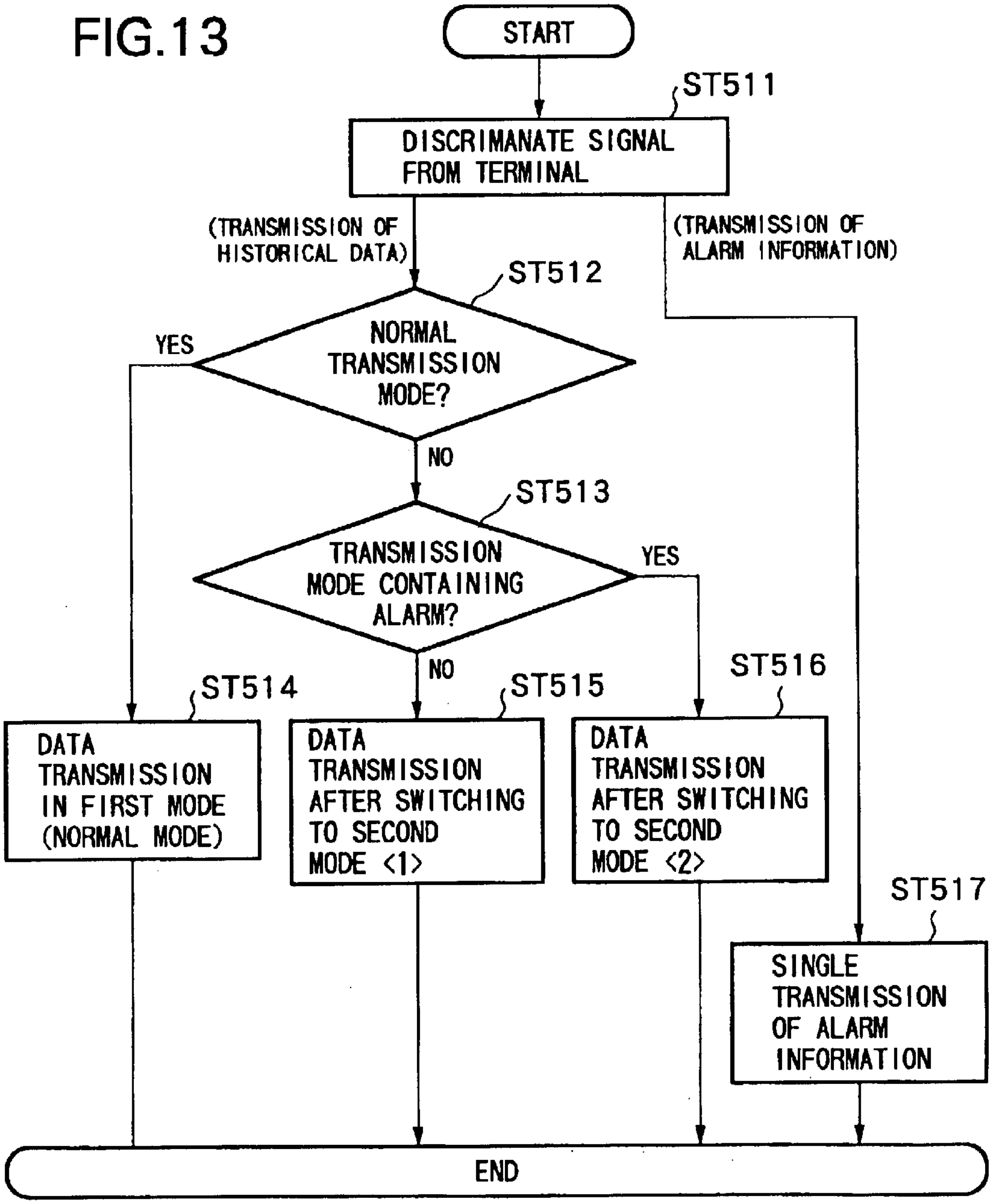
FIG. 13 is a flow chart of a data transmission routine.

FIG. 13 is a flow chart of the data transmission routing according to the present embodiment.

First, at step ST511, the reception signal from the write/read terminal 600 is discriminated. This is discriminated at the signal discriminator 522*a* or only that it is a mode switch signal is discriminated at the signal discriminator 522*a*. The mode content is discriminated at the mode switcher 526*a* receiving the mode switch signal.

When this discrimination result is the mode for transmission of historical data, the processing step proceeds to the next step ST512, at which it is judged whether or not the mode switcher 526*a* is in the usual transmission mode.

When it is in the normal transmission mode, the first mode (normal transmission mode) is maintained at step ST514, and predetermined historical data is transmitted by this mode.

When it is decided at step ST512 that it is not the usual transmission mode, the processing proceeds to step ST513, at which it is further decided whether or not the transmission mode contains broadcast information. Here, the broadcast information is information for widely broadcasting a specific message in the same way as the Morse code "SOS" being generally recognized as meaning a request for help.

When the result of this decision is that it does not contain broadcast information, the transmission mode is switched from the first mode to the second mode <1> at step ST515.

Specifically, the second mode <1> has at least four basic modes: a case where the output of the carrier wave of the information is changed, a case where the frequency of the carrier wave of the information is changed, a case where the method of modulation of the information signal is changed, and a case where the transmission time of the information signal is changed. First, based on the mode switch signal, any of these four basic modes or the optimum mode among composite modes formed by a combination of these basic modes is selected. Then, the mode switcher 526*a* switches the transmission mode from the first mode to the selected mode, then transmits the predetermined historical information in this mode.

Where it is decided at the previous step ST513 that it contains broadcast information, the processing proceeds to step ST516, where the transmission mode is switched from the first mode to the second mode <2>. Namely, first, in the same way as the second mode <1>, the optimum mode is selected from among a plurality of modes differing in the four elements of the output, frequency, method of modulation, and transmission time independently or in combination and containing the broadcast information. Then, the mode switcher 526*a* switches the transmission mode from the first mode to the selected mode, then the predetermined historical data and the broadcast information are simultaneously transmitted in this mode.

On the other hand, single transmission of the broadcast information is sometimes discriminated at the first step ST511. This is not accomplished with transmission of the historical data. As the transmission mode, in the same way as steps ST515 and ST516, a predetermined mode differing in the four elements of the output, frequency, method of modulation, and transmission time from those of the normal mode solely or in combination is determined in advance. After the transmission mode is switched to the predetermined mode, the predetermined broadcast information is solely transmitted. Note that the predetermined broadcast information (containing the broadcast information of step ST516) is stored in advance in the storage unit 524 or another storing means is separately provided and the broadcast information is read from it for use.

As described above, in the present embodiment, the output, frequency, method of modulation, transmission time, etc. at the time of transmission can be changed. For this reason, for example, it is possible to set the first mode as the short distance transmission mode using a weak radio wave requiring only a small power consumption and set the second mode as the long distance transmission mode reaching a far position.

By this, it is possible to send an instruction from a remote terminal to the historical information recording device 510 to control it to transfer the historical data to another remote terminal.

Further, when the second transmission mode is defined as the mode equipped with a broadcast, broadcast information indicating the location of the product can be automatically added to the historical information for transfer. Alternatively, it is also possible to solely transmit the broadcast information.

By utilizing such a transmission mode changing function, this historical information recording device can be used for investigation of stolen goods, investigations of crimes, searches at the time of disasters, etc. For example, a stolen car will retain the content of the electrically recorded guarantee and a chassis registration number as they are even if the license plate is changed, so if this recorded data is read out at for example highway toll gate, it becomes easy to discover stolen cars and to help arrest criminals. Further, in the case of theft, not limited to automobiles, since usually data such as the date of sale thereof, the store, and the registration are not recorded, when the stolen goods are found, or based on the already known data such as the manufacturing serial number, theft can be curbed by forcibly preventing the operation of the stolen goods by remote control.

Further, in the case of someone becoming lost or injured in the mountains, it would be possible to search for the historical information recording device provided in the backpack or radio by radio waves or the like and focus in on the area of response to find the party faster.

On the other hand, it is also possible to make a predetermined means in the product start up by the product controller 501*a* receiving the startup signal. For example, when the product is an automobile, it is possible to make the headlights of the automobile flash and make the horn sound continuously. Due to this, it is possible to broadcast that there is trouble to the surroundings and thereby encourage quick assistance from the surroundings.

Various embodiments of the historical information recording device of the present invention and a product provided with this were explained above, but the present invention is not limited to these. Various modifications are possible to the embodiments of the present invention.

For example, the transmission and reception carrier of the historical information recording device can be not only a radio wave, but another electromagnetic wave such as light. It is also possible to input and output data to and from the historical information recording device by an electric signal, voice, or bar code or other image. In accordance with such a change, the historical information recording device should be provided with a suitable input/output means, for example, a light receiving element, light emitting element, input/output terminal, microphone, speaker, and bar code reader. When the carrier is light, it is also possible to provide a photoelectric cell to eliminate the need for a power supply. In all cases, basically the write and the read operations of the historical data are carried out by a non-contact method, but in the case of for example an image, it is possible to read the data by contact as well.

Finally, a brief explanation will be given of the preferred form of packaging in the case where the carrier of the historical information is light or the like.

Figure 14:
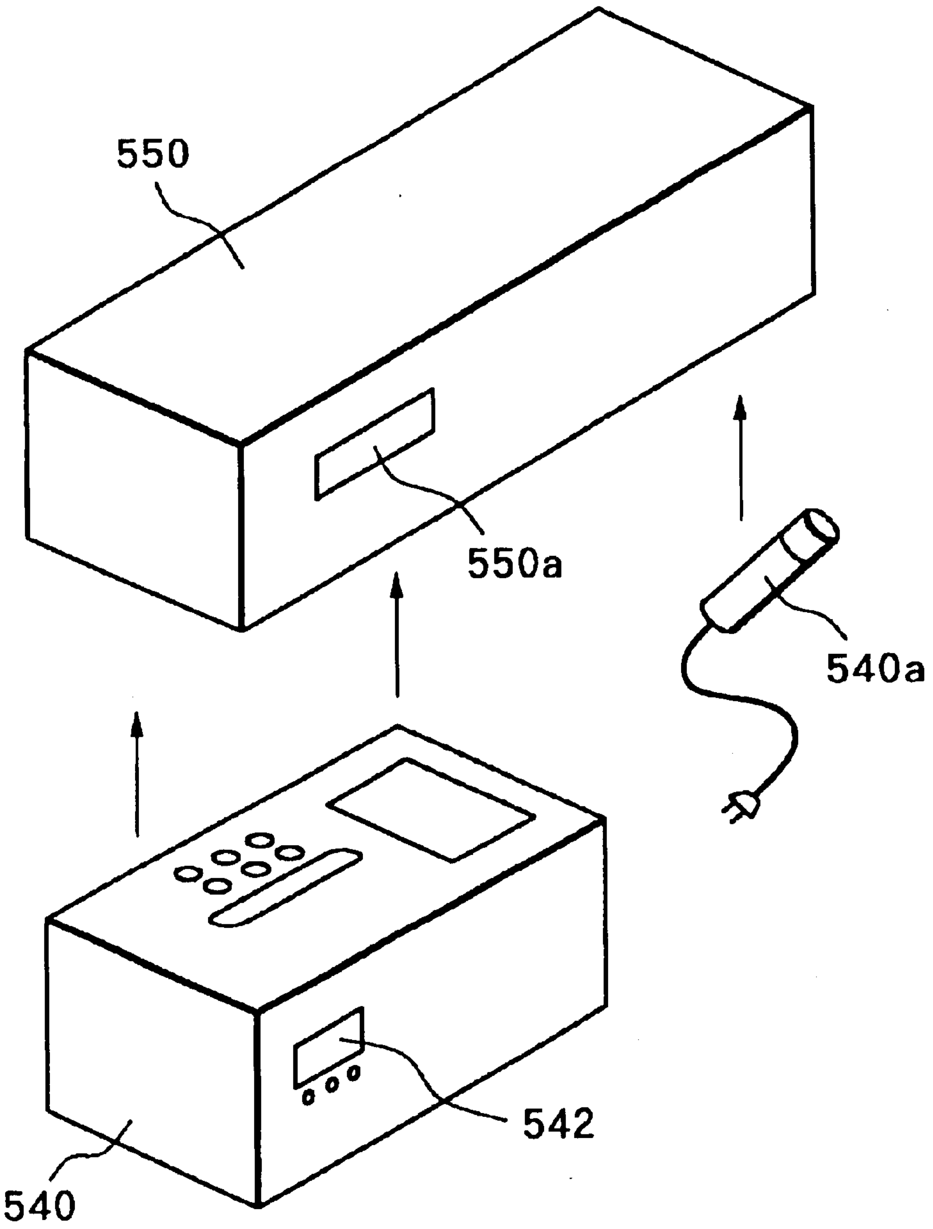
FIG. 14 is a view of the mode of packaging taking as an example a tape recorder provided with a microphone.

FIG. 14 shows the form of packaging taking as an example a tape recorder provided with a microphone.

In FIG. 14, reference numeral 540 denotes a tape recorder as the product, 540*a* a microphone, and 550 a packaging material.

This tape recorder 540 has the historical information recording device built in so that its light receiver 542 is exposed at the outer surface of the product. On the other hand, the packaging material 550 is provided with a window portion 550*a* comprised of for example a transparent film adhered at a position corresponding to this light receiver 542 when the product is covered at the time of packaging. Accordingly, a write or read operation of the historical information to or from to the historical information recording device built in the tape recorder 540 becomes possible by bringing the write/read terminal close to the device in the packaged state. On the other hand, in the case of an electric signal or bar code, it is possible to modify this so that a window with a lid is provided through the terminal or the bar code reader are exposed to the outside.

In this way, by modifying the packaging material in accordance with the type of the conveyance carrier etc., it becomes possible to remotely control the content of the historical information recording device while in the packaged state. Further, the device is resistant to noise, so correct writing and reading of historical information become possible.

The historical information recording device does not always have to be formed as a single chip IC as in FIG. 10 and FIG. 11. A similar configuration can be realized also by constituting this by a plurality of ICs or by mounting individual parts on a board. In this case, it is also possible for form the fixed memory and the rewrite memory as individual semiconductor elements. Further, in the configuration of FIG. 11, the input signal was immediately input to the drive voltage generating means 528 and the required voltage was generated early, but it is also possible to demodulate the reception signal and use the carrier component after demultiplexing from the signal component for the generation of the voltage. In this case, when building in a special battery etc. or there is a button battery or the like in the product, it is possible to use the same as the source of supply of the drive voltage of the reception processor 522. Further, it is possible to drive all of the units 522 to 526 by a battery. It is not necessary to use the coil type antenna as the input unit in this case.

As described above, according to the historical information recording device of the present invention and the product provided with this, it becomes possible to keep track of a broad range of the product history spanning the manufacture, physical distribution, sale, registration, repair, and disposal of the product. Further, by changing the transmission mode, it is possible to transfer information over a long distance and further to impart a broadcast function to the product.

In the past, each stage of the product had been managed independently, for example, just the manufacture or just the sale. Since this was done by entering the management data on paper or the like separate from the product, the management data was easy to lose. Further, the format was different, so the environment was not right for interchangeableness. On top of this, once a product was placed on sale and appeared on the market, it became impossible to manage the history for every product.

Contrary to this, using this historical information recording device, it becomes possible to construct a product history management system in which standardization is imparted to the data among the sectors involved in handling a product and the transfer of information is standardized. By this, the efficiency of management efficiency in the sectors involved in the handling of the product can be greatly enhanced.

Further, for example, as previously explained, the problem of for example the free repair of a product out of its guarantee period by the manufacturer or repair center is solved and fairness can be ensured.

Further, identification etc. of the product becomes possible at any location. Further, since a broadcast function is provided, the present historical information recording device and product using this exhibit a variety of effects which have not yet been seen. For example they are useful for the prevention theft, investigation of crime, and rescues.

Fifth Embodiment

In the fourth embodiment described above, the storage unit 524 was divided into the fixed memory region 524*a* and the rewrite memory region 524*b*. By storing product historical information for which a rewrite is inherently unnecessary, for example, the manufacturing serial number, in the fixed memory region 524*a*, rewrites were prevented for part of the product historical information. Further, by inquiring about the ID as in the example of operation shown in FIG. 12, it was possible to prevent improprieties to a certain extent.

As opposed to this, the present embodiment relates to a historical information recording device and product provided with this which further strongly prevent improprieties by imparting the function of prevention of tampering of the product historical information to the historical information recording device itself and, at the same time, preventing destruction of the product historical information even in the case of frequent reading.

Figure 15:
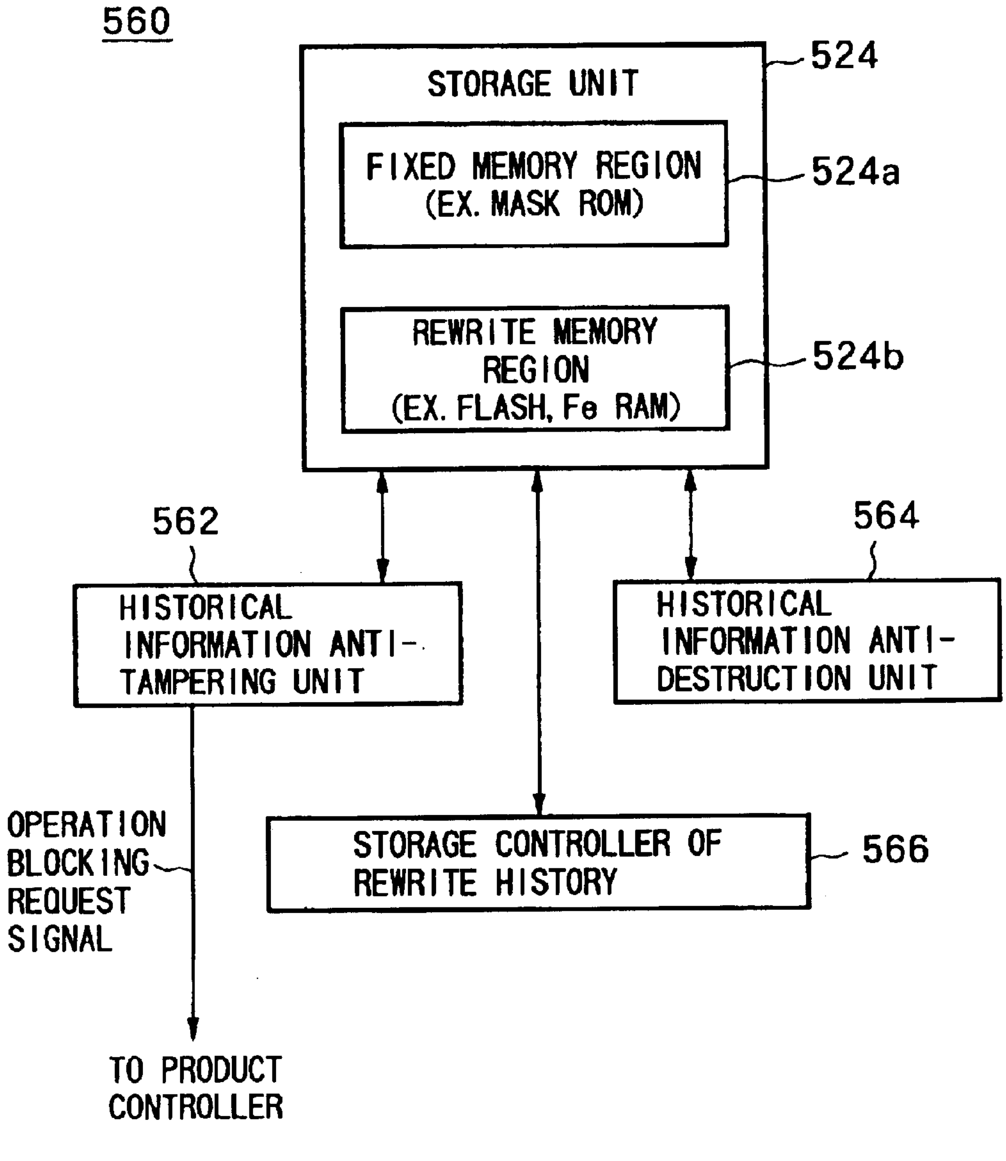
FIG. 15 is a view of principal parts of the historical information recording device according to a fifth embodiment of the present invention.

FIG. 15 is a view of the principal parts of a historical information recording device according to the present embodiment.

The historical information recording device 560 of the present example shown in FIG. 15 is comprised of a historical information tamper prevention unit 562, a historical information destruction prevention unit 564, and a rewrite history storage controller 566 newly added to the historical information recording device 510 according to the fourth embodiment. These historical information tamper prevention unit 562, historical information destruction prevention unit 564, and rewrite history storage controller 566 are connected to the storage unit 524.

The portions of the configuration of this historical information recording device 560 other than that shown in FIG. 15 are similar to those of FIG. 11 according to the fourth embodiment. Namely, as shown in FIG. 11, the IC 520 is provided with the storage unit 524 and the reception processor 522, transmission processor 526, drive voltage generator 528, and timer 529. The coil antenna 530 is formed outside of the IC 520. Further, for the configuration of elements other than the historical information recording device 560, the product controller 501*a* is provided inside the product, and the write/read terminal 600 is provided outside of the product.

Further, the basic operation is similar to that of the fourth embodiment.

Below, the operation of the historical information tamper prevention unit 562, historical information destruction prevention unit 564, and rewrite history storage controller 566 shown in FIG. 15 will be explained in that order.

The historical information tamper prevention unit 562 prohibits rewrites of the information stored in the storage unit under predetermined conditions.

As conditions for prohibition of rewrites, for example, the following conditions can be imposed solely or in suitable combinations.

First, a password is requested when transmitting a rewrite request signal from the write/read terminal 600. That this rewrite request signal coincides with the legitimate one is made a condition for rewrites. That is, the registered password which is stored in the storage unit 524 at the time of manufacture or the time of sale of the product (for example, tape recorder) to which this historical information recording device 560 is attached and disclosed to the legitimate purchaser of the product or which is provided by the legitimate purchaser is compared with the password indicated by this rewrite request signal. When the passwords coincide, the rewrite is permitted, while when the passwords do not coincide, the rewrite is prohibited. Note that, the registered password used as the standard for comparison is desirably stored in the fixed memory region 524*a*. This is for preventing the registered password from being tampered with.

Second, after a predetermined number of rewrites have already been carried out, it is possible to stop permitting rewrites even if requested. For example, it is decided that each type of product historical information can be written up to two times, that is, product historical information can be written first (initial writing) and be rewritten once. By this, when erroneous data ends up being written at the time of the initial writing, it is possible to allow its correction for convenience. Specifically, for example, the written data is read after the initial writing. When erroneous, the correct product historical information is written, while when correct, the same data is automatically written by a confirmation operation. By this, the third and following writes (second and following rewrites) can no longer be carried out. As a result, tampering with the product historical information is prevented.

Third, it is also possible to set limits on the number of rewrite tries, not the number of actual rewrites. For example, when prohibiting writing by a password, a person trying to tamper with the product historical information sometimes will try rewriting the information several times within a short period while changing the password to look for the true password. In such a case, if prohibiting rewrites when a predetermined number of rewrite tries has been reached, the probability of for example the password being found and the product historical information being tampered with becomes extremely low.

Fourth, when emitting a rewrite request signal from the write/read terminal 600, it is possible to request the identification code of the related write/read terminal 600 and permit a rewrite only in a case where the identification code of the terminal indicated by this rewrite request signal coincides with the identification code of the terminal which performed the writing first and not permit the rewrite when they do not coincide. This is done by noting that usually product historical information is written from a specific terminal. By this, even if for example the terminal itself is forged or a stolen one is used, it becomes impossible to rewrite the product historical information.

Fifth, it is also possible to prohibit a write operation requested after an elapse of a predetermined period from the first writing (initial writing) of the product historical information. This is done taking note of the fact that product historical information is usually written concentratedly within a predetermined period from the initial writing since information is mostly rewritten in order to correct errors at the time of input. That is, there is almost no problem in the work of input of product historical information even if limiting to the period during which a rewrite of the product historical information can be carried out to a predetermined period from the initial writing. On the other hand, if limiting the rewritable period, the probability of intentional tempering of the product historical information can be greatly reduced.

As the actual method of prohibiting writing, for example, it is also possible to prohibit access to mode switching for the rewrite memory region 524*b* in the storage unit 524 so as not to prevent the write mode from being entered or to prohibit the access to the address at which the product historical information has been already stored in the storage unit.

Further, in the present embodiment, it is possible not only to prohibit a write operation, but also to stop the function of the product or interfere with the operation by the product controller 501*a* shown in for example FIG. 11. As an example of stopping the function, for example, the sound may be stopped in the case of a tape recorder. Further, as an example of interfering with the operation, for example, in the case of a video deck, it is possible to superpose an interference signal on the playback image signal and thereby disturb the playback image so that it cannot be used. By considerably lowering the commercial value of the product in this way, it is possible to effectively curb tampering with the product historical information.

When the storage element of for example the storage unit 524 comprises a nonvolatile memory element such as a flash EEPROM, if reading the information frequently, the product historical information is gradually destroyed due to so-called read disturbance, i.e., the change of the data held by the storage element due to the voltage stress applied on the storage element at the time of reading.

The historical information destruction prevention unit 564 limits the reading of the storage unit 524 so as to prevent such destruction of information.

As a limit on a read operation, for example, the historical information destruction prevention unit 564 limits the number of read operations of the historical information from the storage unit 524 to a predetermined number, for example, about 10,000 operations. The number of read operations limited to is made a number which is sufficient in practice for the electronic guarantee (product history recording device) and which ensures a sufficient margin against the read disturbance of the storage element.

Further, it is possible to activate a built in read delay circuit so that it takes a sufficiently long time for a read operation after information is read a predetermined number of times, for example, 10,000 times. For example, if this is set so that it takes 1000 times longer the time than the time taken before after the predetermined number of read operations, it is made impossible to read information within the predetermined usual reading cycle, so it becomes possible to substantial prohibit a read operation.

This read delay can be applied to rewrites of the product historical information as well.

In this application, for example, when rewriting the product historical information in the storage unit 524, the product controller 501*a* controls the device so that the product will not operate until the rewritten product historical information is read. By setting the device to delay the read operation for an extremely long time, for example, up to 24 hours, since the product will not operate until after 24 hours if the product historical information is rewritten (tampered with), it is possible to curb acts of tampering.

On the other hand, the rewrite history storage controller 566 of FIG. 15 is a controlling means for storing the history of the rewrites per se and stores for example the dates of rewrites, the content thereof, and the identification codes of the terminals from which the rewrite requests were issued in the storage unit 524 or other storage means whenever rewrites are performed. By this, a record of when and how was the content of the product historical information was changed can be kept. By checking this record, it becomes easy to determine the facts of when and how was the product historical information was tempered with. Further, since the terminal used for the tampering can be learned, it becomes easy to identify the person who performed the tampering.

Finally, two specific examples of the operation in the present embodiment will be explained by using flow charts.

Figure 16:
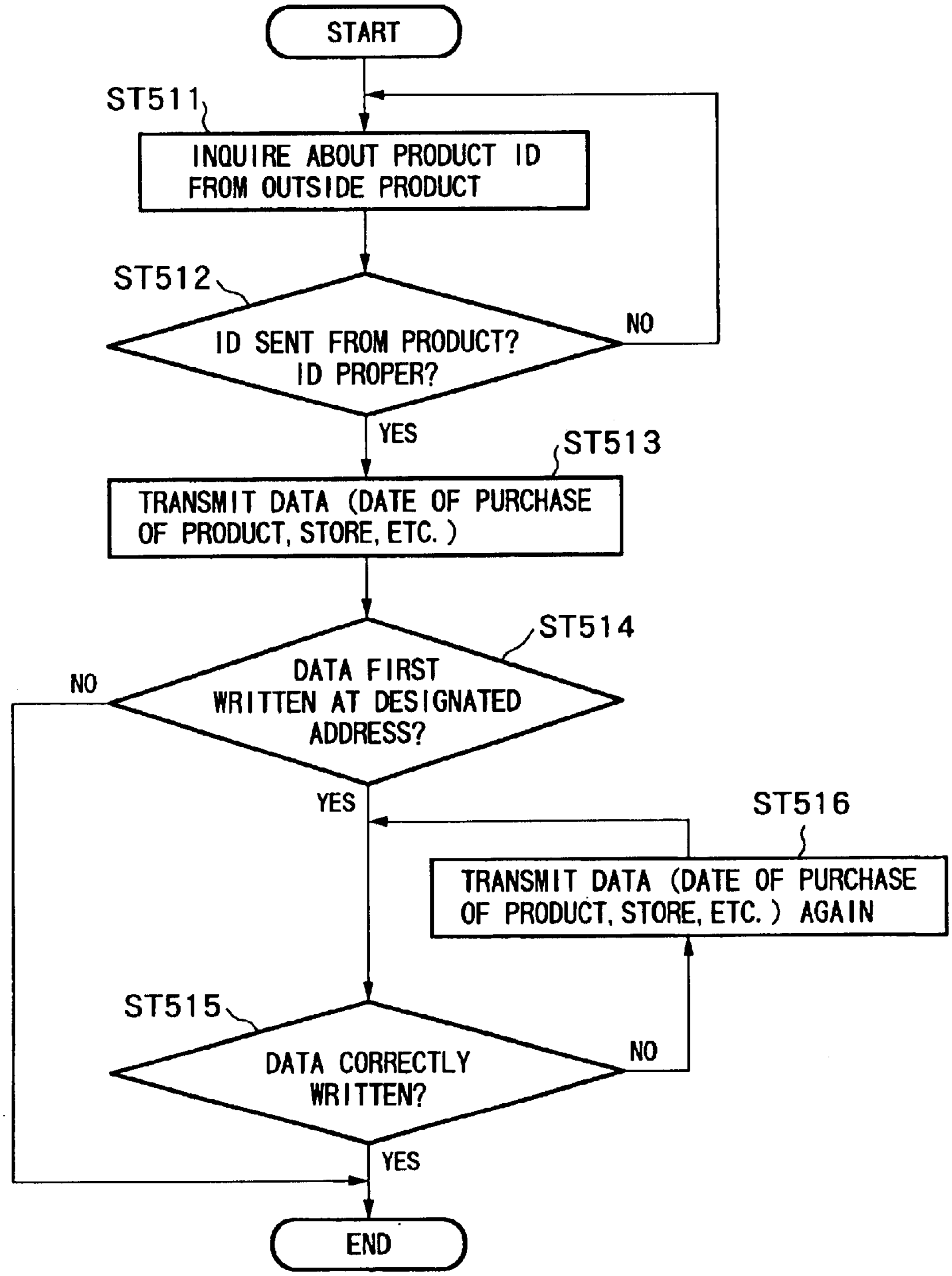
FIG. 16 is a flow chart of a case where the number of write operations is limited to one.

FIG. 16 is a flow chart of the operation when limiting the writing to one time.

The process from the first step ST511 to step ST513 is substantially the same as steps ST501 to ST503 of FIG. 12. The identification number ID of the product (for example, the manufacturing serial number) is read from the fixed memory region 524*a* (step ST511). The legitimacy is judged, that is, if the product is of the company (step ST512), then the historical data relating to the sale is transmitted (step ST513).

At the next step ST514, it is decided by for example the historical information tamper prevention unit 562 whether or not the data is being written first at the predesignated address of the rewrite memory region 524*b* for writing of data.

When the result is that the data is being written at the designated address for the first time, the writing to the designated address is permitted and the processing proceeds to the next step ST515. When it is not the first time, the writing is prohibited and the process is terminated.

At step ST515, in the same way as step ST504 of FIG. 12, the storage unit 524 reads the written historical data for verification and transmits this to the write/read terminal 600. The write/read terminal 600 receiving this signal is used to verify if the data has been correctly written.

When the result of this verification is that the data is not correct ("NO"), the write request signal is transmitted and the data is written again, then the written data is read and verified as mentioned above. The operations of writing, reading, and verifying the data are repeated until it is decided that the data is correct.

When the result of the verification is that the data is correct ("YES"), the write processing is terminated.

Note that, in the above example, the number of write operations was restricted to one. To limit the number of write operations to several times (n), it may be decided at step ST514 whether or not the number of write operations is less than n and writing be permitted only when it is less than n.

Figure 17:
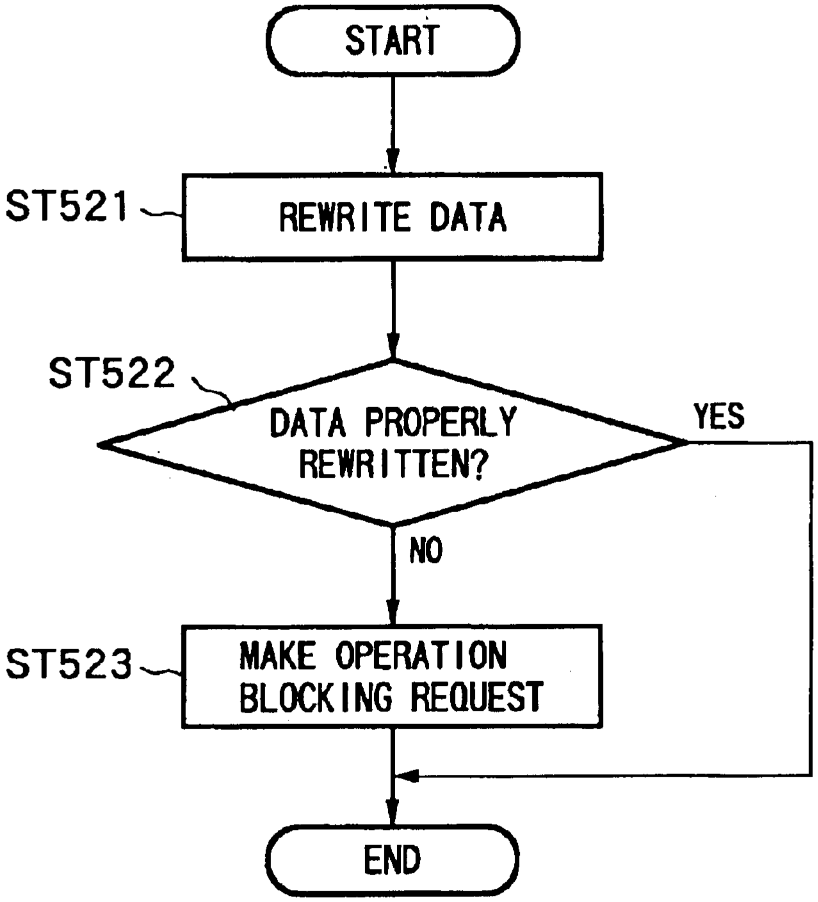
FIG. 17 is a flow chart of a case when interfering with the operation of a product as an example of action taken when a rewrite is performed improperly.

FIG. 17 is a flow chart of a case of interfering with the operation of the product as an example of action taken when data is being improperly rewritten.

When the data in the rewrite memory 524*b* is rewritten at step ST521, it is decided at the next step ST522 if this had been properly carried out. This decision is made by the historical information tamper prevention unit 562. It is decided that the data rewrite was "tampering" of the product historical information only when for example the password, number of rewrites or tries, terminal identification code, or elapsed time from the initial writing satisfied the above conditions.

When the data was properly rewritten, that is, when the above conditions were not satisfied, the processing is terminated.

When the data was not properly rewritten and one of the above conditions is satisfied, the processing proceeds to the next step ST523.

At step ST523, for example, an operation interference request signal is issued from the historical information tamper prevention unit 562 to the product controller 501*a* and a predetermined operation of the product is interfered with by this. For example, when the product is a video deck, the playback image is disturbed to such an extent that it is not usable. After this, the processing is terminated.

Note that it is possible to directly issue an interference signal from the historical information tamper prevention unit 562 to the product. Further, it is possible to issue a signal not for interfering with the operation, but stopping the function or operation.

In the historical information recording device of the present embodiment and a product provided with this, tampering with the product historical information is effectively prevented or curbed. Further, even if the data is frequently read, the destruction of the product historical information due to a read disturbance is effectively prevented. As a result, the reliability of the product historical information becomes high.

The rewrite history of the product historical information is stored. Due to this, it becomes easy to determine the fact of the tampering, identify the person doing the tampering, etc.

Sixth Embodiment

Below, a sixth embodiment of the present invention will be explained in detail by referring to FIG. 18 to FIG. 24.

FIG. 18 to FIG. 21 are views of a product, that is, a radio cassette tape recorder 610, having a historical information recording and/or reproduction device, that is, a remote control device 650, and a historical information recorder, that is, a recording device 630, according to this embodiment of the present invention.

Figure 18:
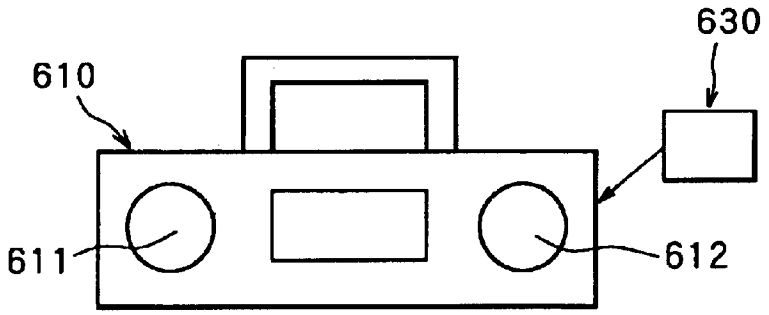
FIG. 18 is a schematic view of a radio cassette tape recorder having a remote control device and a recording device according to a sixth embodiment of the present invention.

In FIG. 18, the radio cassette tape recorder 610 has a well known configuration and receives the usual AM/FM broadcast or plays back a compact cassette tape etc. to produce sound from the two speakers 611 and 612.

Further, the radio cassette tape recorder 610 has the recording device 630 for example integrally provided in it. Note that this recording device 630 is the electronic guarantee (electronic history) and can be either built into the radio cassette tape recorder 610 or can be attached later to the outside surface of the radio cassette tape recorder 610.

Figure 19:
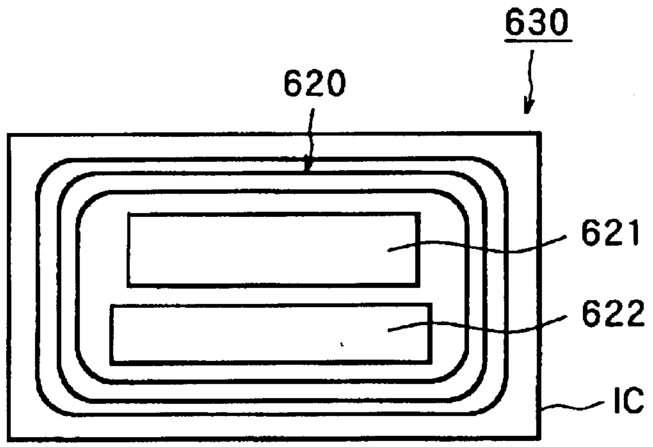
FIG. 19 is a schematic view of the recording device of FIG. 18.

This recording device 630 is formed by for example an IC and, as shown in FIG. 19, is comprised of a combination of for example a coil type antenna 620, a memory 621, and a controller 622. This coil type antenna 620 is used also at the input of the historical information etc. to the memory 621 and at the output of the historical information etc. recorded in the memory 621.

Further, the controller 622 is for example a CPU etc. and provides instructions for when inputting the historical information etc. to the memory 621 or when outputting the historical information etc. recorded in the memory 621.

Further, the memory 621 has a ROM 621*a* and a random access memory 621*b* (RAM). This ROM 621*a* is formed by for example a mask ROM. Further, this RAM 621*b* is formed by for example an FeRAM or a flash memory.

This ROM 621*a* has recorded in it the historical information relating to the radio cassette tape recorder 610, for example, the product name of the radio cassette tape recorder 610, model number, date of manufacture, body color, place of production, production factory, production line number, date of manufacture, name of the person in charge of assembly, name of the person in charge of the product inspection, and the date of shipment.

Note that this ROM 621*a* part may be replaced by RAM 621*b*.

Further, the RAM 621*b* has recorded in it the historical information after shipment of the radio cassette tape recorder 610, for example, the historical information relating to the sale of the radio cassette tape recorder 610 or the historical information relating to the repair at the time of breakdown. As the historical information relating to the sale, there are specifically the date of sale, name of the store, name of the person in charge of the sale, and the sale price. Further, as the historical information relating to the repair, there are for example the date of repair, content of the repair, and the name of the person in charge of the repair.

Note that, as the historical information, it is also possible to write distribution historical information, for example, the distribution process from the shipment to the sale, that is, the dates of arrival at intermediate wholesalers, the dates of shipment from them, and the names of the wholesalers.

In FIG. 19, the memory 621 is constituted as a single IC, but it is clear that individual parts can be mounted on a board too.

Figure 20:
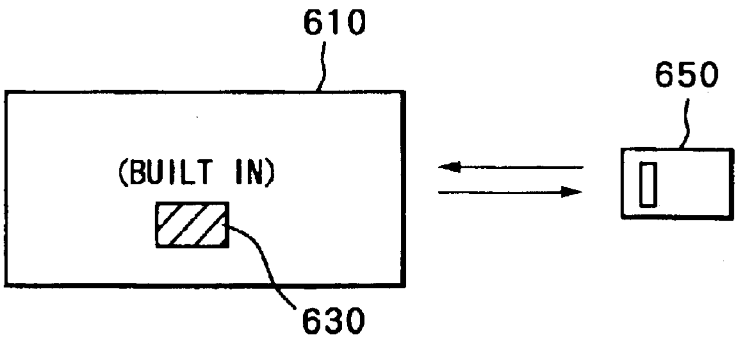
FIG. 20 is a schematic view in which the recording device of FIG. 19 is arranged in the radio cassette tape recorder.

FIG. 20 is a view of the state of provision of the recording device 630 in the radio cassette tape recorder 610. In the figure, the recording device 630 is installed inside the radio cassette tape recorder 610 as the electronic guarantee.

This recording device 630 records and/or reproduces the historical information. As the device for recording and/or reproducing the historical information, the historical information recording and/or reproducing device, that is, a remote control device 650, is provided.

This remote control device 650 is not built into the radio cassette tape recorder 610 unlike the recording device 630, but is separately constituted from the radio cassette tape recorder 610 and the recording device 630.

The historical information is recorded and/or reproduced in or from the recording device 630 by the remote control device 650 by a non-contact method.

Figure 21:
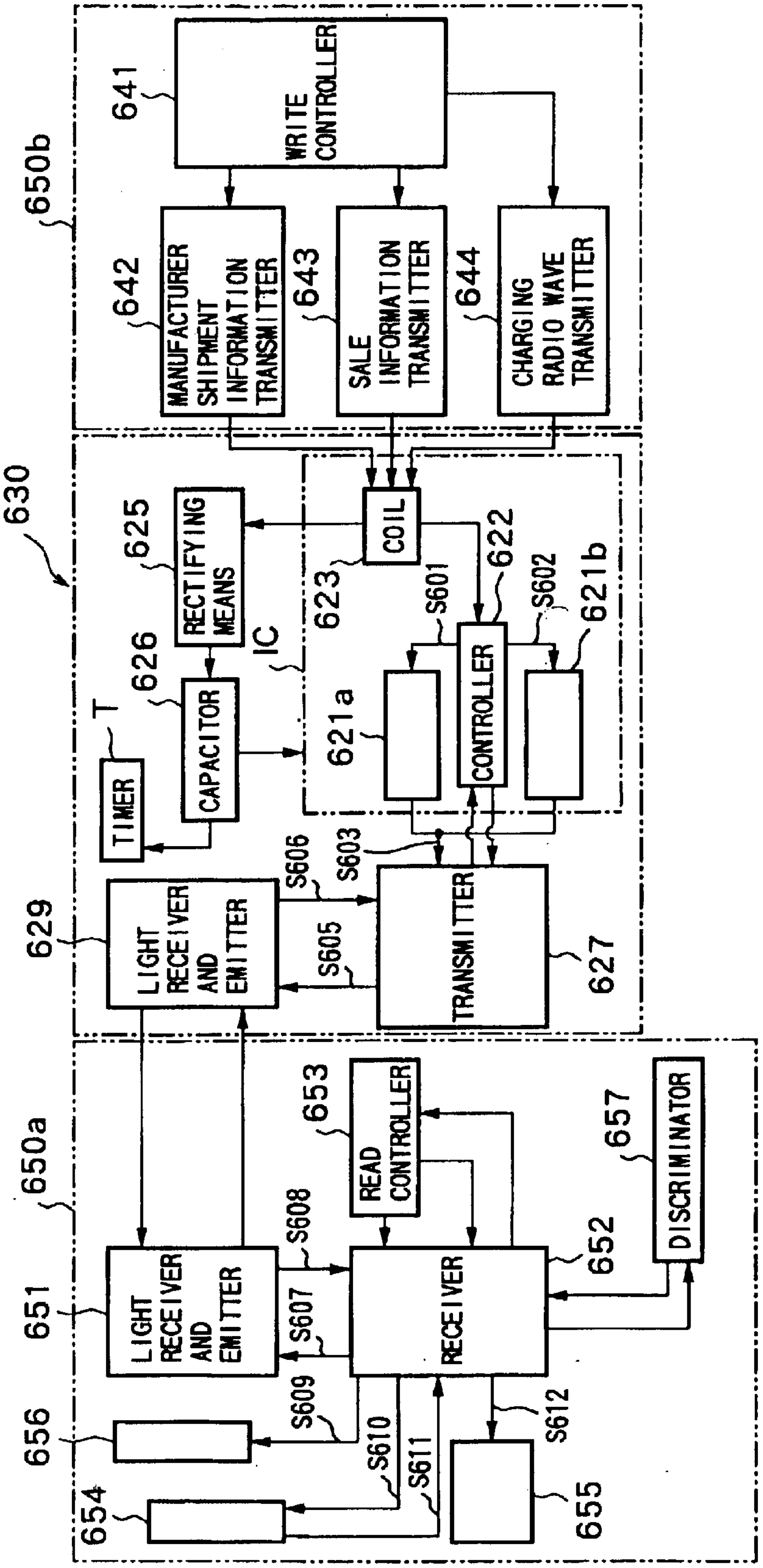
FIG. 21 is a schematic view of the electrical configuration of the recording device and the remote control device of FIG. 20.

FIG. 21 shows the electrical configuration of the recording device 630 and the remote control device 650.

The recording device 630 is arranged at the center portion of FIG. 21. At the right side of this recording device 630 is shown the recorder of the remote control device, that is, the write unit 650*b*. Further, at the left side of the recording device 630 is shown a read unit 650*a* as the playback unit of the remote control device.

The write unit 650*b* of this remote control device is part of the remote control device 650 and specifically has a write controller 641, a manufacturer shipment information transmitter 642, a sale information transmitter 643 of the store, a charging radio wave transmitter 644, and so on.

By an instruction from this write controller 641, the historical information, that is, for example, the manufacturer shipment information relating to the product, is transmitted to the input unit of the recording device 630, that is, the coil 623, via the manufacturer shipment information transmitter 642 as for example a magnetic field modulated signal.

Further, for example, the store information at sale relating to the sale is transmitted to the coil 623 via the sale information transmitter 643 of the store as for example a magnetic field modulated signal.

Further, when the charging radio wave is transmitted to the coil 623 via the charging radio wave transmitter 644 upon an instruction from the write controller 641, the current generated in the coil 623 of the recording device 630 is rectified by the rectifying means and then used to charge the capacitor 626. This makes an internal battery unnecessary.

Further, it is also possible to provide a storage battery, store such electric power, and suitably utilize this electric power.

The ROM 621*a* and RAM 621*b* of the recording device 630 are connected to the coil 623 via the controller 622.

This controller 622 discriminates the type of the historical information input to the coil 623 and inputs the historical information to the determined ROM 621*a* or RAM 621*b*.

Accordingly, as mentioned above, when historical information, that is, the manufacturer's information at shipment and the store information at sale, is input to the coil 623 via the transmitters 642 and 643 as a radio wave, an induction current is produced in this coil 623 based on this radio wave and this current is input to the controller 622.

Then, this controller 622 discriminates the historical information and outputs it to the ROM 621*a* as indicated by S601 when the historical information relates to the product. Further, when the historical information is historical information relating to the sale, as indicated by S602, it is output to the RAM 621*b*. In this way, the historical information is output to the ROM 621*a* and RAM 621*b* where it is recorded.

Further, the recording device 630, as shown in FIG. 21, is provided with a transmitting means for transmitting the historical information to part of the remote control device 650, that is, the read unit 650*a* of the remote control device, that is, a transmitter 627 and a light receiver and emitter 629.

Namely, the historical information recorded in the ROM 621*a* and the RAM 621*b* is first sent to the transmitter 627 as indicated by S603 of FIG. 21. Then, when the light receiver and emitter 629 having the light receiving and emitting element of the recording device 630 receives for example an optical signal from the light receiver and emitter 651 provided in the read unit 650*a* of the remote control device, a signal indicating the reception of the light is sent to the transmitter 627 as indicated by S606.

After receiving this signal, the transmitter 627 transmits the historical information S605 recorded in the ROM 621*a* and the RAM 621*b* to the light receiver and emitter 629 under the instruction of the controller 622. Then, this light receiver and emitter 629 sends this historical information by a non-contact method to the light receiver and emitter 651 of the read unit 650*a* of the remote control device in the form of an electromagnetic wave, for example, an optical signal.

In the present embodiment, the device is constituted so that the historical information is sent from the write controller 641 of the write unit 650*b* of the remote control device via the transmitters 642, 643, and 644 as for example a radio wave, but the present invention is not limited to this. It is also possible to send it by a non-contact method by for example light, which is an electromagnetic wave the same as a radio wave, voice, an image, or an electric signal.

Particularly, when the historical information is written by optical transmission, it becomes possible to correctly record information without being affected much at all by noise in comparison with a radio wave.

Further, the remote control device 650 shown in FIG. 21 has the write unit 650*b* of the remote control device and the read unit 650*a* of the remote control device as mentioned above. The read unit 650*a* of this remote control device, as shown in FIG. 21, is provided with a receiving means for receiving the historical information from the light receiver and emitter 629 of the recording device 630, that is, the light receiver and emitter 651, the receiver 652, and the read controller 653.

Note that this light receiver and emitter 651 has for example a light receiving and emitting element in the same way as the light receiver and emitter 629 of the recording device 630. When the user reproduces, that is, reads the historical information recorded in the ROM 621*a* and RAM 621*b* of the recording device 630, it operates the read unit 650*a* of this remote control device.

The read unit 650*a* of this remote control device specifically operates as follows.

First, a signal is sent from the receiver 652 to the light receiver and emitter 651 under the instruction of the read controller 653 as indicated by S607. The light receiver and emitter 651 receiving this signal sends for example an optical signal to the light receiver and emitter 629 of the recording device 630 in which the specific historical information to be read is recorded (held).

Figure 22:
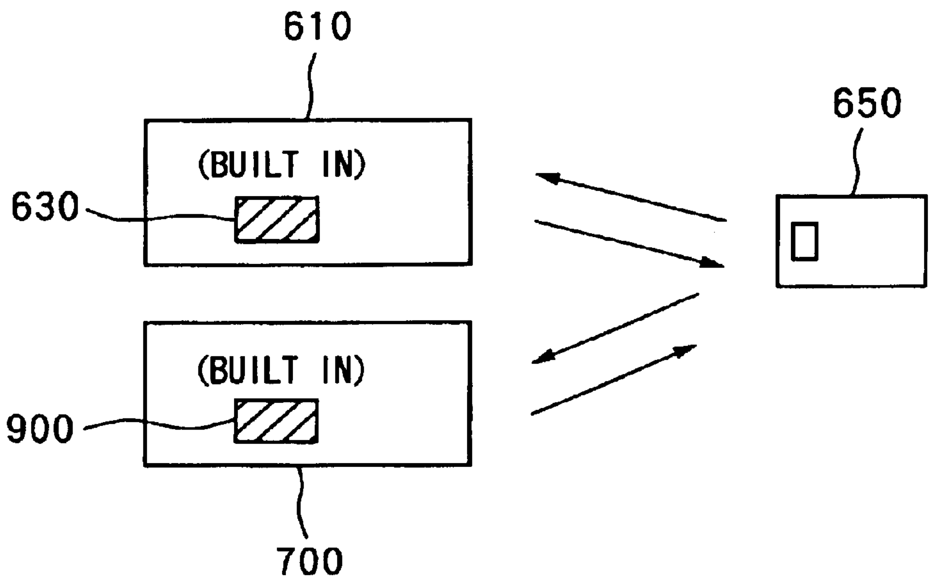
FIG. 22 is an explanatory view of a state of interference.
Figure 23:
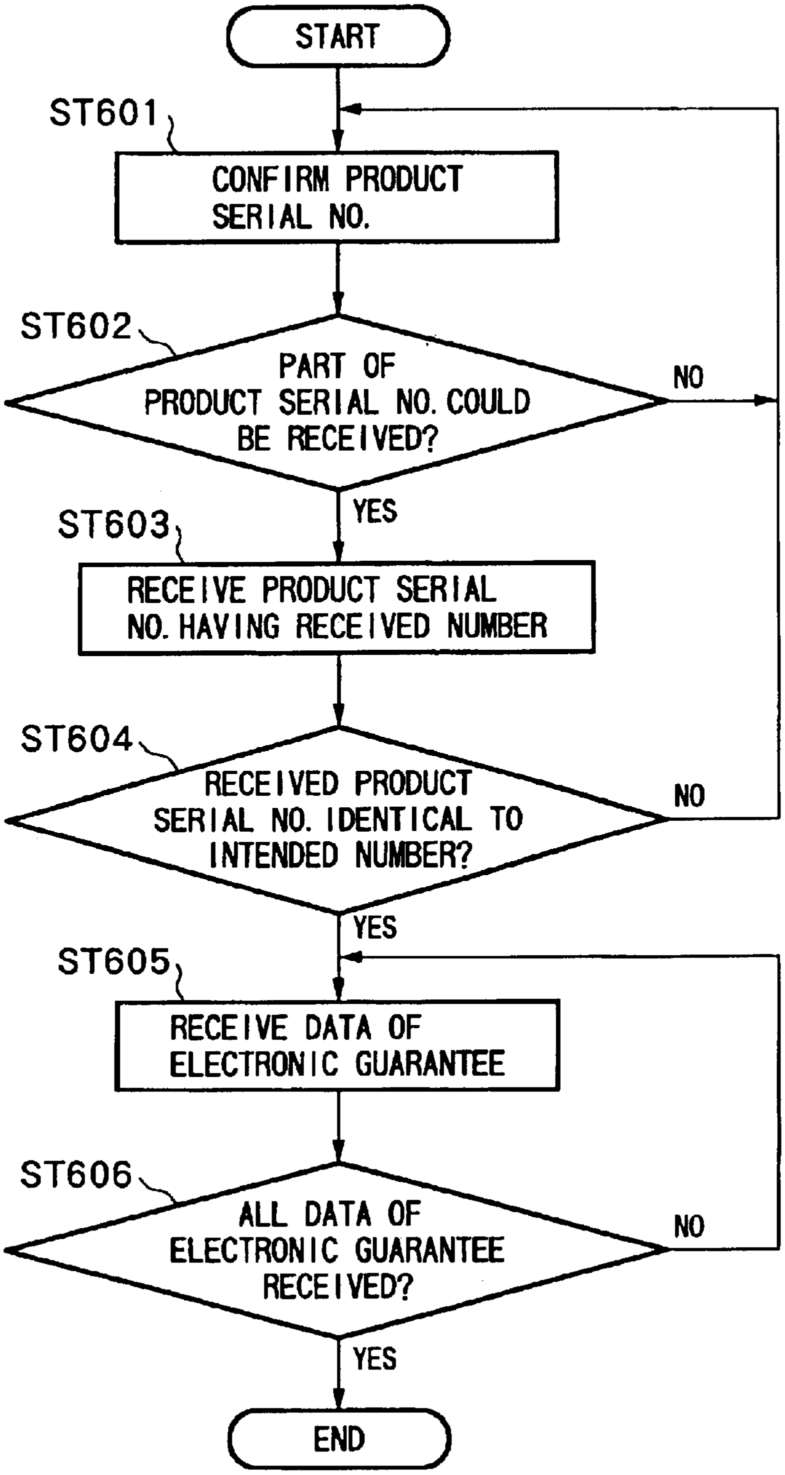
FIG. 23 is a flow chart of a discriminator of FIG. 21.

At this time, if another radio cassette tape recorder 700 is placed near the radio cassette tape recorder 610 having the recording device 630, as shown in FIG. 22, the optical signal strikes not only the light receiver and emitter 629 of the intended recording device 630, but also the light receiver and emitter of the recording device 900 of the other radio cassette tape recorder 700.

In this case, the light receiver and emitter 629 etc. of the intended recording device 630 and the other recording device 900 which received this optical signal will send the requested historical information by a non-contact method in the form of an electromagnetic wave, for example, optical signal, to the light receiver and emitter 651 of the read unit 650*a* of the remote control device under the instruction of the controller 622 etc.

In this state, even if the read unit 650*a* of the remote control device reads the historical information into it, since it ends up receiving as input the unintended historical information, a discriminator 657 for discriminating whether or not it is the specific intended historical information is provided (refer to FIG. 21).

This discriminator 657 operates as follows. First, it transmits the signal from the light receiver and emitter 651 to the recording device under the instruction of the read controller 653 of the read unit 650*a* of the remote control device shown in FIG. 21. This signal is for confirming whether or not this historical information of the recording device is the historical information of a specific product serial no. (ID number) (ST601).

Next, the response signal from this recording device is analyzed and it is decided whether or not this recording device has the specific intended product serial number, but when there are simultaneous response signals from a plurality of recording devices, interference occurs, so the product serial number cannot be confirmed.

Therefore, first, it is decided whether or not part of the product serial number could be received (ST602). When even part of the specific product serial number could not be received, the product serial number is confirmed again.

When part of the product serial number could be received, the processing proceeds to the next step. When the part of this product serial number which could be received is comprised of numerals, for example, "134", all of the numerals of the product serial number are received from the recording device containing "134" in the product serial number (ST603).

It is decided whether or not all of the numerals of this received product serial number are the same as the specific intended product serial number, that is, whether or not the number is the intended product serial number (ST604).

Here, when the number is the same as the intended product serial number, the read unit 650*a* of the remote control device receives the historical information (data) of the recording device having this product serial number (ST605).

Thereafter, the reception of all of the intended historical information is confirmed (ST606) and the reception is terminated.

In the read unit 650*a* of the remote control device, by performing such processing, for example, as shown in FIG. 22, even if response signals are simultaneously input to the read unit 650*a* of the remote control device from the recording devices as a plurality of guarantees, no interference will occur and the historical information of the specific intended recording device 630 can be read.

When the reception of the historical information is terminated in the light receiver and emitter 651 and the receiver 652 of the recording unit 650*a* of the remote control device as described above, as shown in FIG. 21, the receiver 652 sends a signal to the end sign unit 656 (S609). This end sign unit 656 is provided with for example a light emitting diode, therefore, when receiving this signal, this light emitting diode will light up. Further, by the turning on of the end sign unit 656, the user of the read unit 650*a* of the remote control device can confirm the end of reception of the historical information.

Further, the historical information received by this receiver 652 is recorded in the recorder 654 as shown in FIG. 21 (S610). The historical information recorded in the recorder 654 in this way is displayed on the display, that is, the liquid crystal display 55, through the receiver 652 according to need (S611, S612).

Accordingly, by the present embodiment, the specific historical information recorded in the recording device 630 as the electronic guarantee of the radio cassette tape recorder 610 can be read without interference with the historical information of other products by the discriminator 657 provided in the read unit 650*a* of the remote control device. By this, the interference when reading historical information from a plurality of recording devices as guarantees can be prevented.

Further, since this interference can be prevented, the reliability of the recording device as the electronic guarantee can be raised, and it becomes possible to mount this recording device as an electronic guarantee in a wide range of products.

Figure 24:
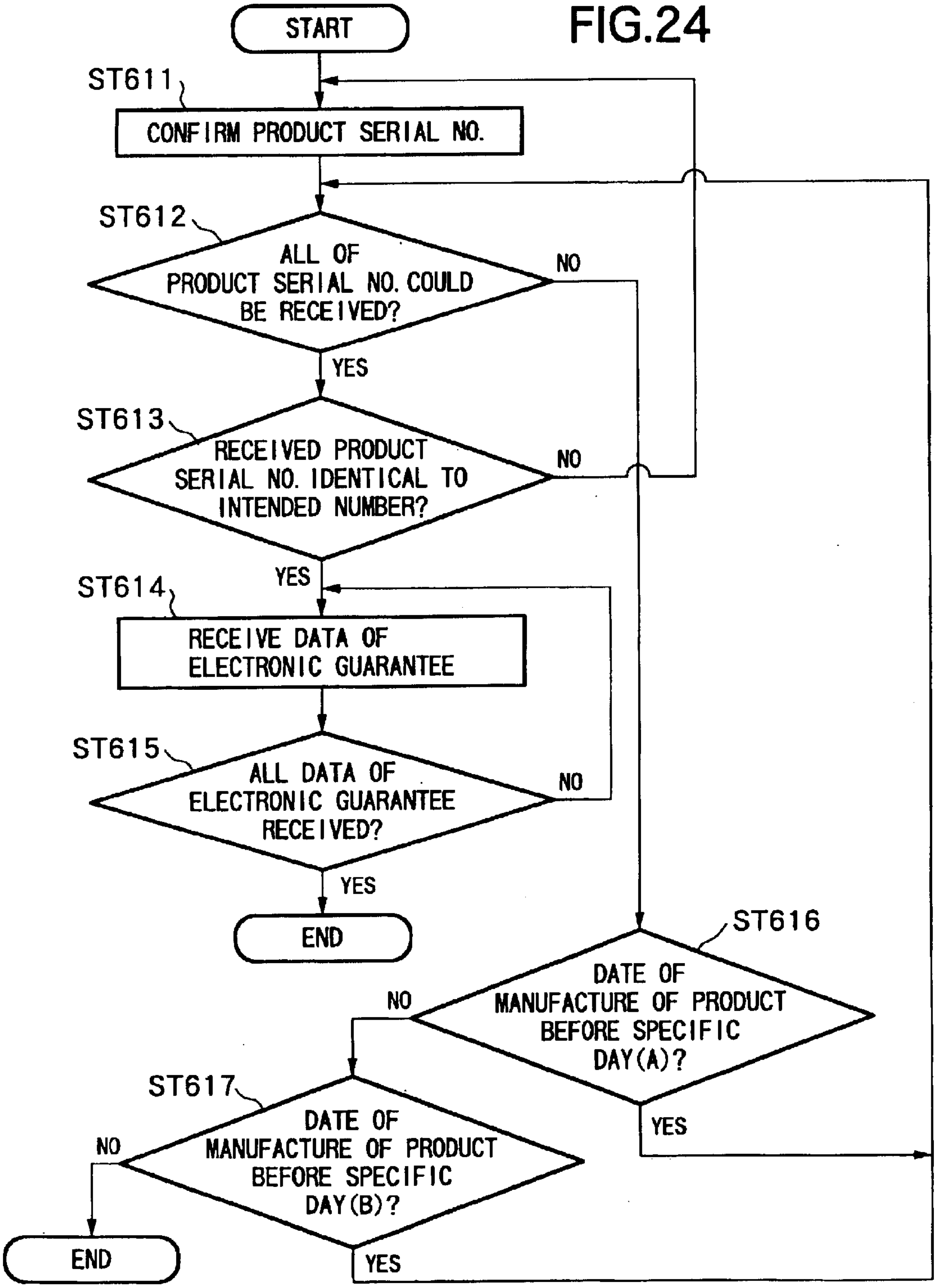
FIG. 24 is a flow chart of a modification of the flow chart of FIG. 23.

FIG. 24 is a flow chart of a modification of the operation of the discriminator 657 according to the present embodiment. In the present modification, the discriminator operates as follows. An explanation of parts the same as those of the discriminator 657 of the above embodiment will be omitted.

First, the confirmation of the product serial number indicated by ST611 of FIG. 24 is similar to that of the above embodiment, but in the present modification, ST612 is different from that of the above embodiment. Namely, at ST612, it is decided whether or not the read unit of the remote control device receives all of the product serial number of the recording device of the product.

When all of the product serial number is received, in the same way as the above embodiment, it is decided if the received product serial number is the same as the intended number (ST613). When they are the same, the data (historical information) of the electronic guarantee is received (ST614). When all of the data is received (ST615), the processing is terminated.

On the other hand, when all of the product serial number could not be received at the above ST612, the processing proceeds to step ST616. At ST616, it analyzes historical information other than the product serial number, for example, judges if the data of manufacture of the product is before (or after) a specific date (ST616). Next, the processing proceeds to step ST612, where the reception of all of the product serial number is enabled.

When the date of manufacture specified at ST616 is insufficient, it is necessary to set different dates as ST617. In the flow chart of FIG. 24, when the condition of ST617 is not satisfied, the processing is terminated, but the invention is not limited to this. It is possible to further provide a discriminator specifying various dates.

Further, the invention is not limited to the date of manufacture as in the present modification. It is also possible to determine if the date of purchase of the product is before (or after) a specific date. Further, it is possible to determine if the manufacturing serial number is larger (or smaller) than a predetermined number.

As the data of the historical information serving as the reference designated in this way, data containing numerals is preferred, but other than this, it is also possible to use data indicating a product had broken down and had been repaired. Further, it is also possible to designate the type, color, etc. of the product.

As described above, according to the discriminator of the present modification, even if the product number of the radio cassette tape recorder 610 or other product cannot be received by the read unit of the remote control device, it is possible to confirm that the device is the specific recording device by receiving other historical information and thereby prevent interference and read the intended historical information.

Note that the discriminator shown in the present modification can of course be used in combination with the discriminator 657 of the above embodiment.

While the invention has been described by reference to specific embodiments chosen for purposes of illustration, it should be apparent that numerous modifications could be made thereto by those skilled in the art without departing from the basic concept and scope of the invention.

What is claimed is:

1. A product management apparatus comprising:

a main unit attached to a product and having an input unit for inputting historical information of the product, a recording means for recording the input historical information, and a transmitting means for transmitting the recorded historical information;

an outside unit having a receiving means for receiving the historical information transmitted by the transmitting means; and further wherein the transmitting means may be remotely configured to change a transmission characteristic of the transmitting means.

2. A product management apparatus as set forth in claim 1, wherein the outside unit further comprises a display for displaying the historical information.

3. A product management apparatus as set forth in claim 1, wherein the main unit and the outside unit are separate from each other.

4. A product management apparatus as set forth in claim 1, wherein the historical information is displayed on a display separate from the outside unit.

5. A product management apparatus comprising:

a main unit having an input means for inputting historical information, a password imparting means for giving a password for at least part of the input historical information, a recording means for recording the historical information, and a transmitting means for transmitting the recorded historical information; and further wherein the transmitting means may be remotely configured to change a transmission characteristic of the transmitting means, and an outside unit having a receiving means for receiving the historical information transmitted from the transmitting means, a password comparing means for comparing the password given to the transmitted historical information, and a password inputting means for inputting a password to the password comparing means.

6. A product provided with a historical information recording device comprising:

a main unit comprising an input means for inputting historical information, a password imparting means for giving a password for at least part of the input historical information, a recording means for recording the historical information, and a transmitting means for transmitting the recorded historical information; and further wherein the transmitting means may be remotely configured to change a transmission characteristic of the transmitting means.

said main unit communicates with an outside remote controller said outside unit comprising: a receiving means for receiving the historical information transmitted from the transmitting means, a password comparing means for comparing the password given to the transmitted historical information, and a password inputting means for inputting a password to the password comparing means.

7. A product management apparatus comprising an information recording device in a product for storing information relating to the product and means for transmitting the information in response to a signal input from the outside; and further wherein the transmitting means may be remotely configured to change a transmission characteristic of the transmitting means.

8. A product management apparatus as set forth in claim 7, wherein a mode switcher selects a first transmission mode at a time of usual use and switches the transmission mode from the first transmission mode to a second transmission mode based on the input signal.

9. A product management apparatus as set forth in claim 8, wherein transmission of product information uses a radio wave.

10. A product management apparatus as set forth in claim 9, wherein the second transmission mode includes a transmission mode where the output power of a carrier wave transmitting the product information differs from that of the first transmission mode.

11. A product management apparatus as set forth in claim 9, wherein said second transmission mode includes a transmission mode where a frequency of a carrier wave transmitting the product information differs from that of the first transmission mode.

12. A product management apparatus as set forth in claim 9, wherein said second transmission mode includes a transmission mode where a method of modulation of the signal indicating the product information differs from that of the first transmission mode.

13. A product management apparatus as set forth in claim 9, wherein said second transmission mode includes a transmission mode where a transmission time of the signal indicating the product information differs from that of the first transmission mode.

14. A product management apparatus as set forth in claim 9, wherein said second transmission mode includes a transmission mode which indicates a location of the product.

15. A product management apparatus as set forth in claim 14, wherein a transmission mode of the signal including the announcing information in the second transmission mode differs from the first transmission mode in at least one of the output power, frequency, method of modulation, and transmission time of the carrier wave.

16. A product management apparatus as set forth in claim 7, wherein transmission of product information uses a radio wave.

17. A product management apparatus as set forth in claim 7, wherein a predetermined announce signal is transmitted in response to an input broadcast request signal without transmission of product historical information.

18. A product management apparatus as set forth in claim 7, wherein said historical information recording device comprises:

a fixed memory which is restricted to be written with information once and a rewritable memory which allows the stored information to be rewritten.

19. A product management apparatus comprising:

a historical information recording device in a product and wherein the historical information recording device has a storage unit for storing product historical information relating to the product and further including a transmitting means; and further wherein the transmitting means may be remotely configured to change a transmission characteristic of the transmitting means, and having a historical information tamper prevention unit for prohibiting a rewrite of the information stored in the storage unit under predetermined conditions to prevent tampering of the product historical information.

20. A product management apparatus as set forth in claim 19, wherein the historical information tamper prevention unit compares a password stored in the storage unit at the time of manufacture or the time of sale of the product and which is disclosed to the legitimate purchaser of the product or provided by the legitimate purchaser with a password input after the sale of the product and the device prohibits rewrites of the storage unit when the passwords do not match.

21. A product management apparatus as set forth in claim 19, wherein the historical information tamper prevention unit prohibits access to mode switching so as not to enter the write mode for rewrites for an address at which product historical information has already been stored in the storage unit.

22. A product management apparatus as set forth in claim 19, wherein the historical information tamper prevention unit prohibits access at the time of writing for an address at which the product historical information has already been stored in the storage unit.

23. A product management apparatus as set forth in claim 19, wherein the historical information tamper prevention unit allows rewrites of the storage unit a predetermined number of times and prohibits rewrites after the predetermined number of rewrites.

24. A product management apparatus as set forth in claim 19, wherein the historical information tamper prevention unit allows rewrites of the storage unit until a predetermined number of tries have been made and prohibits rewrites after the predetermined number of tries.

25. A product management apparatus as set forth in claim 19, wherein the historical information tamper prevention unit receives as an input a rewrite request signal for product historical information, discriminates an identification code from a terminal emitting the rewrite request signal, and compares the identification code with an identification code of the terminal first writing the product historical information for which the rewrite request has been made into the storage unit, and prohibits a rewrite of the product historical information depending on negative result of the comparison.

26. A product management apparatus as set forth in claim 19, wherein the historical information tamper prevention unit prohibits the rewrite of the product historical information requested after a predetermined time has elapsed from the initial writing based on time elapsed from the first writing when the product historical information was first written in the storage unit.

27. A product management apparatus as set forth in claim 19, wherein said historical information recording device further comprises a rewrite history storage controller for storing the rewrite historical information relating to the rewrites of the storage unit from the input signal and storing the information.

28. A product management apparatus comprising a historical information recording device in a product and said historical information recording device having:

a storage unit for storing product information, and a historical information destruction prevention unit for adding a predetermined limit on the read operations from the storage unit to prevent destruction of the product historical information by a read disturbance.

29. A product management apparatus as set forth in claim 28, wherein the historical information destruction prevention unit limits the number of read operations when the storage unit comprises a nonvolatile memory device.

30. A product management apparatus as set forth in claim 28, wherein the historical information destruction prevention unit extends the time required for read operations from the storage unit after the predetermined number of read operations when the storage unit is comprised of a nonvolatile memory device.

31. A product provided with an information recording device for storing product information and a means for transmitting the information in response to a signal input from the outside; and further wherein the transmitting means may be remotely configured to change a transmission characteristic of the transmitting means.

32. A product as set forth in claim 31, wherein said product has a product controller and said historical information recording device has a means for outputting to the product controller a startup signal for starting up a predetermined means in the product able to announce the location of the product.

33. A product as set forth in claim 31, wherein a mode switcher serves also as a means for outputting a startup signal.

34. A product provided with an information recording device for storing product information, wherein said information recording device has a tamper prevention unit for prohibiting rewrites of information stored in the storage unit under predetermined conditions to prevent tampering of the product historical information and further comprising a means for transmitting the information; and further wherein the transmitting means may be remotely configured to change a transmission characteristic of the transmitting means.

35. A product as set forth in claim 34, wherein said product has a product controller and said controller stops a predetermined function of the product when the product historical information has been tampered with.

36. A product provided with an information recording device for storing in a storage unit product information, wherein said information recording device has an information destruction prevention unit for adding a limit to the read operations from the storage unit to prevent destruction of the product historical information due to read disturbances.

37. A product provided with an information recording and/or reproducing device for recording and/or reproducing information to and from a specific information recorder in which specific information should be held, wherein the information recording and/or reproducing device comprises a discriminator for discriminating whether or not the recorder is the specific historical information recorder and including a transmitting means; and further wherein the transmitting means may be remotely configured to change a transmission characteristic of the transmitting means.

38. A product provided with a historical information recording and/or reproducing device as set forth in claim 37, wherein the discriminator discriminates information including at least numerals held by the historical information recorder to discriminate whether or not the historical information recorder is a specific historical information recorder.

* * * * *